US012675194B2

(12) United States Patent
 Cho et al.

(10) Patent No.: US 12,675,194 B2
(45) Date of Patent: Jul. 7, 2026

(54) DISPLAY DEVICE, METHOD OF OPERATING THE SAME, AND ELECTRONIC DEVICE

(71) Applicant: SAMSUNG DISPLAY CO., LTD., Yongin-si (KR)

(72) Inventors: Han Su Cho, Yongin-si (KR); Jun Young Ko, Yongin-si (KR); Hee Woong Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/092,113

(22) Filed: Mar. 27, 2025

(65) Prior Publication Data
 US 2025/0383739 A1 Dec. 18, 2025

(30) Foreign Application Priority Data

Jun. 18, 2024 (KR) ........................ 10-2024-0078740
Aug. 12, 2024 (KR) ........................ 10-2024-0107618

(51) Int. Cl.
 *G06F 3/041* (2006.01)
 *G01K 3/00* (2006.01)
 *G06F 3/044* (2006.01)
 *G06V 40/13* (2022.01)

(52) U.S. Cl.
 CPC ......... *G06F 3/04186* (2019.05); *G01K 3/005* (2013.01); *G06V 40/1306* (2022.01); *G06F 3/0446* (2019.05)

(58) Field of Classification Search
 None
 See application file for complete search history.

(56) References Cited

U.S. PATENT DOCUMENTS

| | | | |
|---|---|---|---|
| 6,570,707 B1 | 5/2003 | Murakami et al. |
| 11,662,859 B2 | 5/2023 | Kim et al. |
| 12,105,915 B2 | 10/2024 | Cho et al. |
| 2024/0288966 A1 | 8/2024 | Oh et al. |

FOREIGN PATENT DOCUMENTS

| | | |
|---|---|---|
| KR | 10-0744403 B1 | 7/2007 |
| KR | 10-2020-0101255 A | 8/2020 |
| KR | 10-2023-0052365 A | 4/2023 |
| KR | 10-2668223 B1 | 5/2024 |
| KR | 10-2024-0133856 A | 9/2024 |
| WO | WO2020050530 A1 | 3/2020 |

*Primary Examiner* — Aneeta Yodichkas
(74) *Attorney, Agent, or Firm* — F. CHAU & ASSOCIATES, LLC

(57) ABSTRACT

A display device includes a display panel including pixels, a sensor array disposed on the display panel and including sensor electrodes, a sensor driver which detects a touch input using the sensor electrodes, and a temperature sensor for detecting a temperature of the sensor array. The sensor driver obtains a first sensing value from the sensor electrodes in a touch release state, and compares the first sensing value with a reference value corresponding to the temperature to determine whether the first sensing value includes an error. The sensor driver obtains a second sensing value from the sensor electrodes in a touch state. When it is determined that the first sensing value includes the error, the sensor driver detects the touch input based on the reference value and the second sensing value.

20 Claims, 16 Drawing Sheets

| | | | | | | | | | |
|---|---|---|---|---|---|---|---|---|---|
| : | : | : | : | : | : | : | : | : | : |
| 691 | 681 | 679 | 677 | 674 | 670 | 667 | 665 | 662 | : |
| 705 | 693 | 690 | 687 | 684 | 681 | 679 | 676 | 672 | : |
| 707 | 709 | 693 | 760 | 800 | 700 | 680 | 677 | 674 | : |
| 710 | 697 | 800 | 798 | 755 | 757 | 780 | 679 | 676 | : |
| 712 | 698 | 696 | 780 | 785 | 740 | 683 | 681 | 676 | : |
| 701 | 688 | 685 | 683 | 785 | 677 | 674 | 672 | 668 | : |
| 686 | 674 | 672 | 669 | 780 | 664 | 662 | 659 | 655 | : |
| : | : | : | : | 668 | : | : | : | : | : |

ERA

LUT1_T1

| | | | | | | | | | |
|---|---|---|---|---|---|---|---|---|---|
| : | : | : | : | : | : | : | : | : | : |
| 691 | 681 | 679 | 677 | 674 | 670 | 667 | 665 | 662 | : |
| 705 | 693 | 690 | 687 | 684 | 681 | 679 | 676 | 672 | : |
| 707 | 709 | 693 | 689 | 686 | 683 | 680 | 677 | 674 | : |
| 710 | 697 | 694 | 690 | 688 | 684 | 682 | 679 | 676 | : |
| 712 | 698 | 696 | 692 | 689 | 686 | 683 | 681 | 676 | : |
| 701 | 688 | 685 | 683 | 680 | 677 | 674 | 672 | 668 | : |
| 686 | 674 | 672 | 669 | 668 | 664 | 662 | 659 | 655 | : |
| : | : | : | : | : | : | : | : | : | : |

LUT2

| Temperature(°C) | Offset value |
|---|---|
| -20 | 1.33 |
| -5 | 1.18 |
| 10 | 1.11 |
| 25(Room temperature) | 1.00 |
| 40 | 0.95 |
| 55 | 0.87 |
| 70 | 0.80 |

DISPLAY DEVICE, METHOD OF OPERATING THE SAME, AND ELECTRONIC DEVICE

CROSS-REFERENCE TO RELATED PATENT APPLICATION

This application claims priority to Korean patent application No. 10-2024-0078740, filed on Jun. 18, 2024, and Korean patent application No. 10-2024-0107618, filed on Aug. 12, 2024, and all the benefits accruing therefrom under 35 U.S.C. § 119, the entire disclosures of which are herein incorporated by reference in their entireties.

BACKGROUND OF THE INVENTION

1. Field

One or more embodiments of the present disclosure relate to an electronic device, and more specifically to a display device, a method of operating the display device, and electronic device.

2. Discussion of the Related Art

The importance and use of display devices continues to be at the forefront of technological advances. Examples of display devices include liquid crystal display devices and organic light emitting display devices. These and other types of display devices include a display panel for displaying moving and still images and a sensor array for sensing a touch location. The sensor array may be used to measure coordinates of the touch location of an object, or to determine proximity, e.g., whether an object is nearby.

The above description is merely intended to help understand the background technology for the technical ideas of the present invention.

SUMMARY OF THE INVENTION

One or more embodiments of the present disclosure provide a display device with improved reliability, and a method of operating the same. For example, in a touch release state, such as when the display is at an idle state or the user is not touching the display device, one of more embodiments of the present disclosure may prevent misrecognition of a touch input on the display device. One of more embodiments of the present disclosure may detect a touch input more accurately, for example, by comparing a sensing value and a reference value corresponding to temperature to determine the existence of an error.

Other embodiments of the present disclosure provide an electronic device and a method of operating a display device with improved reliability.

A display device according to an embodiment of the present disclosure includes a display panel including pixels, a sensor array disposed on the display panel and including sensor electrodes, a sensor driver which detects a touch input using the sensor electrodes, and a temperature sensor for detecting a temperature of the sensor array, wherein the sensor driver obtains a first sensing value from the sensor electrodes in a touch release state, and compares the first sensing value with a reference value corresponding to the temperature to determine whether the first sensing value includes an error, and obtains a second sensing value from the sensor electrodes in a touch state, and when it is determined that the first sensing value includes the error, detects the touch input based on the reference value and the second sensing value.

The sensor driver may determine that the first sensing value includes the error when a difference between the first sensing value and the reference value exceeds a reference range, and determine that the first sensing value does not include the error when the difference between the first sensing value and the reference value is within the reference range.

The sensor driver may receive a first sensing signal from the sensor electrodes in the touch release state, and acquire the first sensing value from the first sensing signal, receive a second sensing signal from the sensor electrodes in the touch state immediately after the touch release state is released, and acquire the second sensing value from the second sensing signal, and detect the touch input based on a difference between the reference value and the second sensing value when it is determined that the first sensing value includes the error.

The sensor driver may generate a correction reference value by applying an offset value corresponding to the temperature to the reference value, and generate a second correction sensing value by applying the offset value to the second sensing value.

The sensor driver may generate the correction reference value by multiplying the reference value and the offset value, and generate the second correction sensing value by multiplying the second sensing value and the offset value, and detect the touch input based on a difference between the correction reference value and the second correction sensing value.

The offset value may increase as the temperature decreases.

The offset value may be set as a ratio of a second reference value at room temperature to a first reference value at a particular temperature.

The sensor driver may detect the touch input based on a difference between the first sensing value and the second sensing value when it is determined that the first sensing value does not include the error.

The sensor driver may apply an offset value corresponding to the temperature to the first sensing value to generate a first correction sensing value, and apply the offset value to the second sensing value to generate a second correction sensing value.

The sensor driver may generate the first correction sensing value by multiplying the first sensing value by the offset value, and generate the second correction sensing value by multiplying the second sensing value by the offset value, and detect the touch input based on a difference between the first correction sensing value and the second correction sensing value.

The display device may further include a memory in which the reference value corresponding to the temperature of the sensor array is stored.

An offset value corresponding to the temperature may be further stored in the memory.

An ultrasonic fingerprint sensor configured to generate ultrasonic signals for fingerprint recognition may be connected to the sensor driver, and the temperature sensor may be included in the ultrasonic fingerprint sensor.

A method of operating a display device including a sensor array having sensor electrodes includes detecting a temperature of the sensor array, obtaining a first sensing value from the sensor electrodes in a touch release state, comparing the first sensing value with a reference value corresponding to the temperature to determine whether the first sensing value includes an error, obtaining a second sensing value from the sensor electrodes in a touch state, and detecting a touch input based on the reference value and the second sensing value when it is determined that the first sensing value includes the error.

The detecting of the touch input may include applying an offset value corresponding to the temperature to the reference value to generate a correction reference value, applying the offset value to the second sensing value to generate a second correction sensing value, and detecting the touch input based on the correction reference value and the second correction sensing value.

The detecting of the touch input may include detecting the touch input based on a difference between the correction reference value and the second correction sensing value.

The detecting of the touch input may include detecting the touch input based on the first sensing value and the second sensing value when it is determined that the first sensing value does not include the error.

The detecting of the touch input may include applying an offset value corresponding to the temperature to the first sensing value to generate a first correction sensing value, applying the offset value to the second sensing value to generate a second correction sensing value, and detecting the touch input based on the first correction sensing value and the second correction sensing value.

The detecting of the touch input may further include detecting the touch input based on a difference between the first correction sensing value and the second correction sensing value.

An embodiment of the present disclosure includes an electronic device which includes a display device and a power source to provide power to the display device. The display device comprises a display panel comprising pixels, a sensor array disposed on the display panel and comprising sensor electrodes, a sensor driver configured to detect a touch input using the sensor electrodes, and a temperature sensor configured to detect a temperature of the sensor array. The sensor driver is configured to obtain a first sensing value from the sensor electrodes in a touch release state, and compare the first sensing value with a reference value corresponding to the temperature to determine whether the first sensing value includes an error, and obtain a second sensing value from the sensor electrodes in a touch state. When the first sensing value is determined to include the error, the sensor driver is configured to detect the touch input based on the reference value and the second sensing value.

BRIEF DESCRIPTION OF THE DRAWINGS

FIG. 1 is a drawing illustrating a display device according to embodiments of the present disclosure.

FIG. 7 is a diagram showing an embodiment of a lookup table which stores reference values corresponding to temperature of FIG. 6.

FIG. 8 is a diagram illustrating an operation of the sensor driver of FIG. 6 in a touch release state.

DETAILED DESCRIPTION

Figure 2:
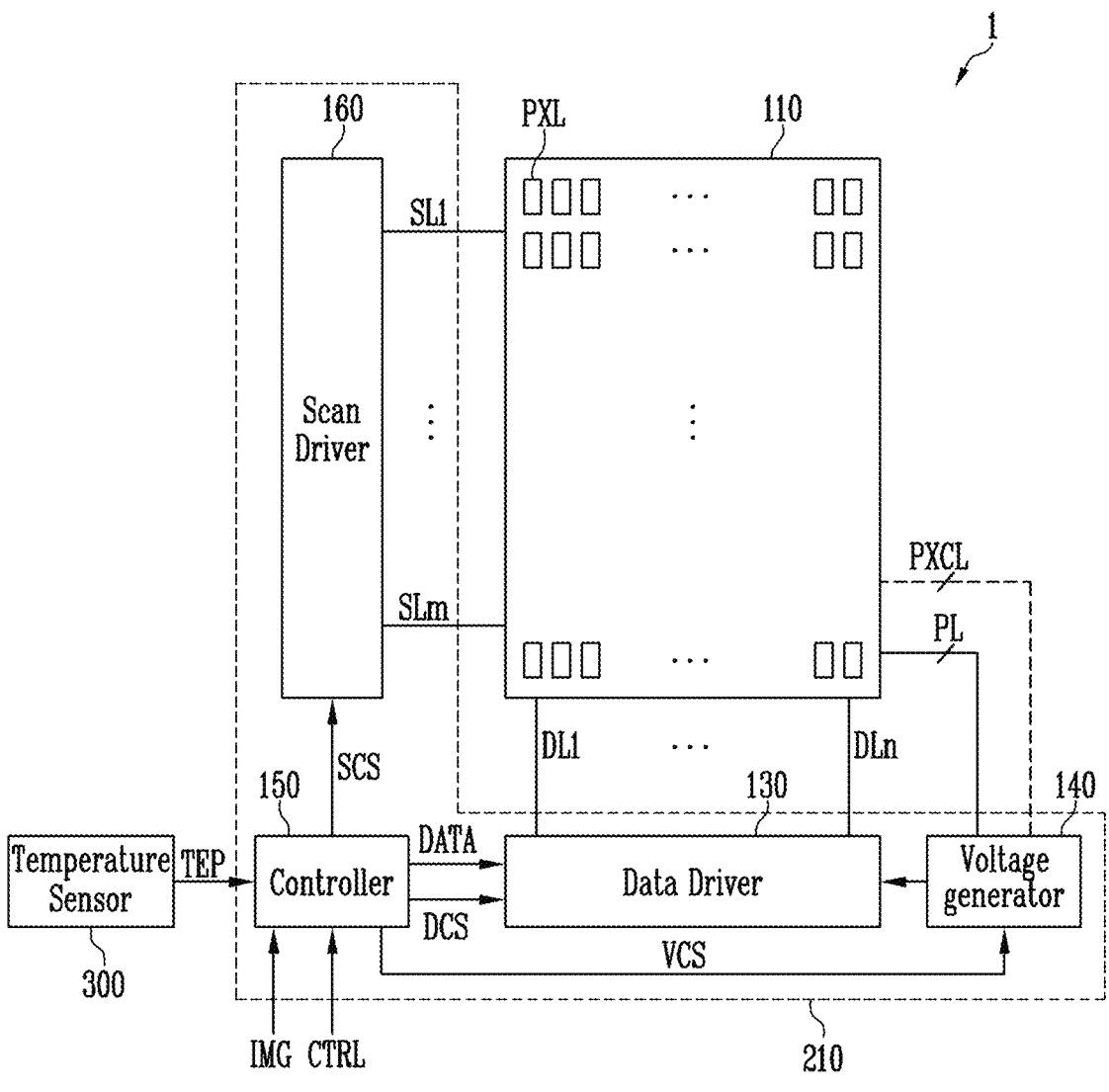
FIG. 2 is a block diagram illustrating an embodiment of a display panel and a display driver of FIG. 1.

Hereinafter, preferred embodiments of the present disclosure will be described in detail with reference to the accompanying drawings. It should be noted that in the following description, only parts necessary for understanding operations according to the present disclosure are described, and a description of other parts will be omitted so as not to obscure the gist of the present disclosure. In addition, the present invention may be implemented in other forms not limited to the embodiments described herein. However, the embodiments described herein are provided to explain the technical idea of the present invention in detail to a degree that a person skilled in the art to which the present invention pertains can easily practice it.

Throughout the specification, when it is mentioned that a part is "connected" to another part, this includes not only the case where they are "directly connected" but also the case where they are "indirectly connected" with other elements disposed therebetween. Terms used herein are for the purpose of describing particular embodiments only and are not intended to limit the disclosure. Throughout the specification, when it is mentioned that a part "includes" a component, this does not mean that the part may include other components, rather than excluding other components, unless otherwise stated to the contrary. "At least any one of X, Y, and Z" and "at least any one selected from a group consisting of X, Y, and Z" may be interpreted as one X, one Y, one Z, or any combination of two or more of X, Y, and Z (e.g., XYZ, XYY, YZ, ZZ). Here, "and/or" includes all combinations of one or more of corresponding configurations.

Here, terms such as first and second may be used to describe various components, but these components are not limited to these terms. These terms are used to distinguish one component from another. Accordingly, a first component may be referred to as a second component without departing from the scope of the present disclosure.

A display device may operate under a variety of conditions. Some of these conditions relate to the environment of the display device. Environmental conditions include the temperature at which the display device is operating. Temperature may have various adverse effects on operation of the display device. For example, at elevated temperatures, a touch sensor of the display device may indicate that a touch input (e.g., a false touch input) has occurred, even though no touch input actually occurred. These elevated temperatures may occur, for example, when a host device is exposed to direct sunlight or based on heat generated by a user's body.

These false (or ghost) touch inputs result from elevated levels of a sensing value output from the touch sensor. Because sensing values output from the touch sensor at elevated temperatures are high (e.g., above a certain value), a detection of a ghost touch may occur in a touch release state, thereby degrading the touch performance of the display device.

In accordance with one or more embodiments, a display device is provided which prevents the detection of a ghost touch from a touch sensor in a touch release state. This may be accomplished by controlling the conditions under which a sensing value from the touch sensor is used to detect a touch input at elevated temperatures. These conditions are controlled by including a temperature sensor in the display device which outputs temperature information to a controller. When the temperature exceeds a reference temperature, the sensing value output from the touch sensor is replaced by a reference value. The reference value allows the controller of the display device to distinguish between actual inputs and ghost inputs.

For example, the display device may determine whether the sensing value corresponds to an actual touch input by using the reference value corresponding to the temperature in the touch release state. If it is determined that it is not an actual touch input (e.g., a ghost input), the touch input may be detected using the reference value corresponding to the temperature instead of the sensing value. As a result, the display is not affected by ghost touches due to temperature changes during the touch release state, and therefore may reliably detect touch inputs, thereby overcoming drawbacks associated with touch sensors in existing display devices.

Figure 1:
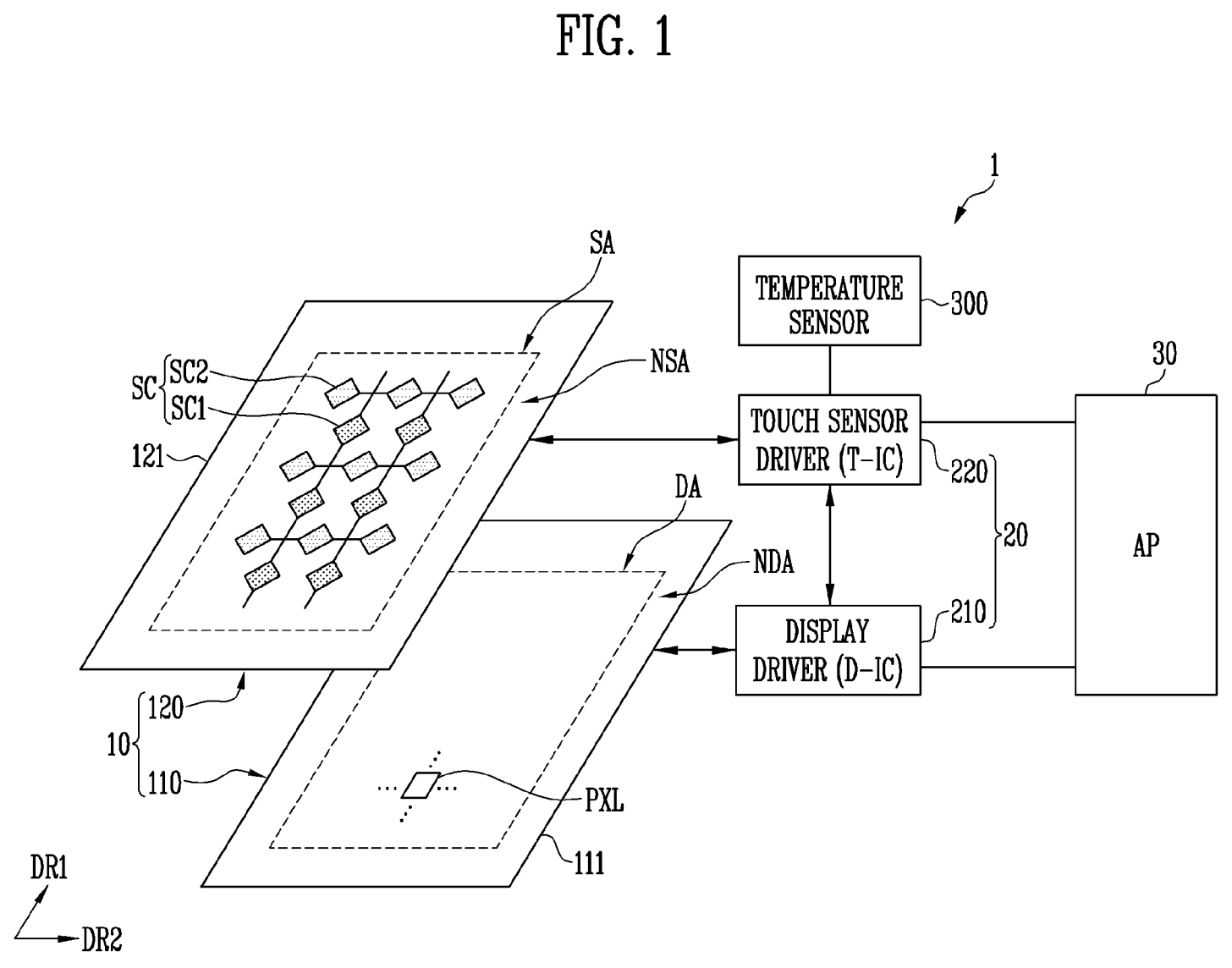

FIG. 1 is a drawing illustrating a display device 1 according to embodiments of the present disclosure.

Referring to FIG. 1, the display device 1 may include a panel 10 and a driver 20 for driving the panel 10. The panel 10 may include a display panel 110 for displaying moving and still images and a sensor array 120 for sensing an input. The input may be in the form of a touch, pressure, fingerprint, hovering, and the like. The panel 10 may include pixels (PXLs) and sensor electrodes (SCs) which overlap at least some of the pixels (PXLs). In one embodiment (e.g., in a mutual capacitance mode), the sensor electrodes (SCs) may include first sensor electrodes (SC1) (or, driving electrodes) and second sensor electrodes (SC2) (or, sensing electrodes). In another embodiment (e.g., in a self capacitance mode), the sensor electrodes (SCs) may be one type of sensor electrodes without distinction between the first and second sensor electrodes (SC1, SC2).

The driver 20 may include a display driver 210 for driving the display panel 110 and a sensor driver 220 for driving the sensor array 120. As explained in greater detail below, the sensor driver may be arranged to receive information from a temperature sensor 300. The pixels (PXLs) may display images in units of display frame periods. The sensor electrodes (SCs) may sense a user input in units of sensing frame periods. The sensing frame period and the display frame period may be independent of each other and may be different in some embodiments. For example, the sensing frame period and the display frame period may be synchro-nized or asynchronous with each other. The sensor driver 220 may form a touch input sensing device together with the sensor array 120.

According to embodiments, the display panel 110 and the sensor array 120 may be manufactured separately from each other and then arranged and/or combined so that at least one area overlaps each other. In another embodiment, the display panel 110 and the sensor array 120 may be manufactured integrally. For example, the sensor array 120 may be formed directly on at least one substrate (e.g., an upper and/or lower substrate of the display panel, or a thin film encapsulation layer) included in the display panel 110, or on another insulating layer or various functional films (e.g., an optical layer or a protective layer).

While the sensor array 120 is illustrated as being placed on the front side of the display panel 110 (e.g., an upper surface where the image is displayed) in FIG. 1, the position of the sensor array 120 is not limited thereto. For example, the sensor array 120 may be disposed on the back side, or both front and back sides, of the display panel 110. As another example, the sensor array 120 may be disposed on at least one edge area of the display panel 110.

The display panel 110 may include a display substrate 111 and a plurality of pixels (PXLs) formed on the display substrate 111. (Only one pixel PXL is shown for illustrative purposes). The display substrate 111 may include a display area (DA) in which images are displayed and a non-display area (NDA) outside (e.g., adjacent to) the display area (DA). According to embodiments, the display area (DA) may be placed in a central area of the display panel 110, and the non-display area (NDA) may be placed along an edge area of the display panel 110 to partially or entirely surround the display area (DA).

The display substrate 111 may be either a rigid substrate or a flexible substrate, and its materials or properties are not particularly limited. For example, the display substrate 111 may be a rigid substrate formed of glass or tempered glass, or a flexible substrate formed of a thin film made of plastic or metal.

The pixels (PXLs) may be disposed in the display area (DA) of the display substrate 111. As described in greater detail below, the pixels (PXLs) may be selected by a scan signal of a turn-on level supplied from corresponding scan lines and may be supplied with data signals from corresponding data lines. The pixels PXLs may emit light having luminances corresponding to the data signals. As a result, an image corresponding to the data signals may be displayed in the display area (DA). A structure of the pixels (PXLs) and a driving method are not limited. For example, each of the pixels (PXLs) may be implemented as a pixel which employs a variety of currently known structures and driving methods.

In the non-display area (NDA), various wires and/or built-in circuits may be disposed to be connected to the pixels (PXLs) of the display area (DA). In the non-display area (NDA), a number of wires may be disposed to supply various power and control signals to the display area (DA), and in addition, one or more drivers (e.g., a scan driver) may be disposed.

The display panel 110 is not limited to a specific type. For example, the display panel 110 may be implemented as a self-emitting type display panel, such as an organic light emitting display panel. When the display panel 110 is implemented as a self-emitting type, it is not limited to the case where each of the pixels (PXLs) includes only one organic light emitting element. For example, a light emitting element of each pixel (PXL) may be formed of an organic light emitting diode, an inorganic light emitting diode, a quantum dot/well light emitting diode, etc. In one embodiment, each pixel (PXL) may be provided with a plurality of light-emitting elements. Here, the plurality of light-emitting elements may be connected in series, parallel, or in a series-parallel arrangement. In one embodiment, the display panel 110 may be implemented as a non-light-emitting type display panel, such as a liquid crystal display panel. If the display panel 110 is implemented as a non-light-emitting type, the display device 1 may further include a light source such as a backlight unit.

The sensor array 120 may include a sensor substrate 121 and the multiple sensor electrodes (SCs) formed on the sensor substrate 121. The sensor electrodes (SCs) may be disposed in a sensor area (SA) on the sensor substrate 121. The sensor area may be formed to overlap the display area DA.

The sensor substrate 121 may include the sensor area (SA) and a peripheral area (NSA). The sensor area SA is an area in which a touch input and the like can be sensed. The peripheral area (NSA) is situated outside of and adjacent to (e.g., around) the sensor area (SA). According to embodiments, the sensor area (SA) may be disposed so that it overlaps at least one area of the display area (DA). In an example, the sensor area (SA) may be an area corresponding to the display area (DA) (e.g., an area overlapping the display area (DA)), and the peripheral area (NSA) may be an area corresponding to the non-display area (NDA) (e.g., an area overlapping the non-display area (NDA)). In this case, when a touch input is provided on the display area (DA), the touch input may be detected by the sensor array 120.

The sensor substrate 121 may be a rigid or flexible substrate and may also include at least one layer of an insulating film. In addition, the sensor substrate 121 may be a transparent or translucent light-transmitting substrate, but is not limited thereto. For example, the material of the sensor substrate 121 and its physical properties are not limited. For example, the sensor substrate 121 may be a rigid substrate formed of glass or tempered glass, or a flexible substrate formed of a thin film made of plastic or metal. In addition, according to embodiments, at least one substrate included in the display panel 110 (e.g., the display substrate 111, an encapsulation substrate, and/or the thin film encapsulation layer), or at least one layer of an insulating film or a functional film disposed inside and/or on an outer surface of the display panel 110 may be used as the sensor substrate 121.

The sensor area (SA) may be an area which can respond to a touch input (e.g., may be an active area of the sensor). For this purpose, the sensor electrodes (SCs) may be placed in the sensor area (SA) for sensing touch inputs on corresponding locations of the sensor relative to the display area DA. According to embodiments, as previously explained, the sensor electrodes (SCs) may include first sensor electrodes (SC1) and second sensor electrodes (SC2). In FIG. 1, each sensor electrode (SC) is illustrated in the shape of a diamond, but may be configured in a variety of shapes, such as a circle, a square, a triangle, or a mesh form.

Each of the sensor electrodes (SCs) may be conductive by including at least one of a metallic material, a transparent conductive material, or a variety of other conductive materials. For example, the sensor electrodes (SCs) may include at least one of a variety of metallic materials including, but not limited to, gold (Au), silver (Ag), aluminum (Al), molybdenum (Mo), chromium (Cr), titanium (Ti), nickel (Ni), neodymium (Nd), copper (Cu), and platinum (Pt), or alloys thereof. The sensor electrodes (SCs) may be disposed in a predetermined pattern, e.g., may be disposed in a mesh form. In addition, sensor electrodes (SCs) may contain at least one of a variety of transparent conductive materials, including, but not limited to, silver nanowires (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nanotubes, graphene, etc. In addition, the sensor electrodes (SCs) may be conductive by including at least one of various conductive materials. Further, each of the sensor electrodes (SCs) may be formed of a single layer or multiple layers, and its cross-sectional structure is not limited to a specific configuration.

The driver 20 may include the display driver 210 for driving the display panel 110 and the sensor driver 220 for driving the sensor array 120. In one embodiment, the display driver 210 and the sensor driver 220 may formed by different integrated chips (ICs), respectively. In one embodiment, at least a part of the display driver 210 and the sensor driver 220 may be integrated together into one IC.

The display driver 210 may be electrically connected to the display panel 110 to drive the pixels (PXLs). For example, the display driver 210 may include a scan driver (e.g., 160, see FIG. 2), a data driver (e.g., 130, see FIG. 2), and a controller (e.g., 150, see FIG. 2) for controlling the scan driver and the data driver. The data driver 130 and the scan driver 160 may be mounted separately in the non-display area (NDA) of the display panel 110.

The sensor driver 220 may be electrically connected to the sensor array 120 to drive the sensor array 120. The sensor driver 220 may include a sensor transmitter and a sensor receiver. According to embodiments, the sensor transmitter and the sensor receiver may be integrated into a single IC, but are not limited thereto.

The display device 1 may further include a temperature sensor 300. The temperature sensor 300 may detect an ambient temperature of the display device 1 or an internal temperature of the display device 1. The temperature sensor 300 may be used by the display device to determine errors occurring during operation of the touch sensor 220. For example, the temperature sensor 300 may generate temperature information that can be used to improve operation of the touch sensor 220 by detecting ghost touch inputs in a touch release state. This may be accomplished by using a reference value in place of a sensing value to detect touch inputs at elevated temperatures, e.g., at temperatures that exceed a predetermined temperature. The placement position of the temperature sensor 300 may be changed in various ways so that sensed temperatures lie within a range in which the ambient temperatures or internal temperatures of the display device 1 can be detected. For example, the temperature sensor 300 may be included in an ultrasonic fingerprint sensor electrically connected to the sensor driver 220.

In embodiments, the sensor driver 220 may compare sensing values obtained from one or more of the sensor electrodes (SCs) in a touch release state with one or more reference values corresponding to the temperature detected by the temperature sensor 300. Based on this comparison, a determination may be made as to whether the sensing values include an error. For example, in a touch release state, the sensor driver 220 may sense a user input and compare it with a reference value at the detected temperature to determine whether the sensing value is an actual touch input or a ghost input (an error). In one embodiment, a plurality of references values may be stored in correspondence with a corresponding number of temperatures as described below.

In the case that the user touch input occurs when the ambient temperature of the sensor array 120 is relatively low (e.g., below a reference value), the temperature of the sensor array 120 (e.g., an area of the sensor array 120 where the touch input occurs) may change by the user's body temperature. Such temperature changes (and temperature re-changes after touch release) of the sensor array (120) may cause ghost touches to be detected. For example, even though there is no actual touch input by the user, the sensor driver 220 may determine that a touch input has occurred based on the sensing value. Therefore, the sensor driver 220 may determine whether the sensing value is caused by an actual touch input (or a ghost touch) by using the reference value corresponding to the temperature stored in advance. For example, when the sensing value is determined to be a ghost touch, the sensor driver 220 may detect the touch input based on the reference value corresponding to the temperature instead of the sensing value alone. Then, the sensor driver 220 may transmit information about the detected touch input to an application processor (AP) 30.

The application processor 30 may be electrically connected to the driver 20. The application processor 30 may provide gradations and timing signals for the display frame period to the display driver 210. The application processor 30 may receive a sensing signal or receive input information (e.g., input by an object and its position) from the sensor driver 220. The application processor 30 may be at least one of a graphics processing unit (GPU), a central processing unit (CPU), or an application processor (AP).

FIG. 2 is a block diagram illustrating an embodiment of the display panel 110 and the display driver 210 of FIG. 1.

Referring to FIG. 2, the display device 1 may include the display panel 110 and the display driver 210. The display driver 210 may include the scan driver 160, the data driver 130, a voltage generator 140, and the controller 150.

The display panel 110 may include the pixels (PXLs). The pixels (PXLs) may be connected to the scan driver 160 through first to m-th scan lines (SL1~SLm). The pixels (PXLs) may be connected to the data driver 130 through first to n-th data lines (DL1~DLn). Each pixel (PXL) may include at least one light-emitting element which is configured to produce light. Accordingly, each pixel (PXL) may produce light of a specific color, such as red, green, blue, cyan, magenta, yellow, or the like.

The scan driver 160 may be connected to the pixels (PXLs) arranged in a row direction through the first to m-th scan lines (SL1~SLm). The scan driver 160 may output scan signals to the first to m-th scan lines (SL1~SLm) in response to a scan control signal (SCS) from the controller 150. In embodiments, the scan control signal (SCS) may include a start signal to indicate the start of each frame and a horizontal synchronization signal to control output of the scan signals synchronously at the timing when the data signals are applied.

The scan driver 160 may be disposed on one side of the display panel 110. However, embodiments are not limited to this. For example, the scan driver 160 may be divided into two or more actuators which are physically and/or logically separated, and such drivers may be arranged on different (e.g., opposing) sides of the display panel 110. As described above, the scan driver 160 may be disposed adjacent to or around the display panel 110 in various forms according to embodiments.

The data driver 130 may be connected to the pixels (PXLs) arranged in a column direction through the first to n-th data lines (DL1~DLn). The data driver 130 may receive image data (DATA) and a data control signal (DCS) from the controller 150. The data driver 130 may operate in response to the data control signal (DCS). In embodiments, the data control signal (DCS) may include, for example, a source start pulse, a source shift clock, and a source output enable signal.

The data driver 130 may use voltages from the voltage generator 140 to apply the data signals having graded voltages (e.g., gradations) corresponding to the image data (DATA) to the first to n-th data lines (DL1~DLn). When the scan signal is applied to each of the first to m-th scan lines (SL1~SLm), the data signals corresponding to the image data (DATA) may be applied to the data lines (DL1~DLn). Accordingly, the corresponding pixels (PXLs) may generate light which correspond to the data signals. Thus, the image may be displayed on the display panel 110. In embodiments, the scan driver 160 and the data drive 130 may include complementary metal-oxide semiconductor (CMOS) circuit elements.

The voltage generator 140 may operate in response to a voltage control signal (VCS) from the controller 150. The voltage generator 140 may be configured to generate a plurality of voltages and provide the generated voltages to the components of the display device 1. For example, the voltage generator 140 may be configured to receive an input voltage from an external source outside the display device 1, adjust the received voltage, and generate a plurality of voltages by regulating the adjusted voltages.

In one embodiment, the voltage generator 140 may generate a first power supply voltage and a second power supply voltage. The generated first and second power supply voltages may be provided to the pixels (PXLs) through corresponding power lines (PLs). In one embodiment, at least one of the first or second power supply voltages may be provided from an external source outside the display device 1.

In addition, the voltage generator 140 may provide a variety of voltages and/or signals. For example, the voltage generator 140 may generate an initialization voltage to be applied to the pixels (PXLs). For example, in a sensing operation of sensing electrical properties of transistors and/or light-emitting elements of the pixels (PXLs), a predetermined reference voltage may be applied to the first to n-th data lines (DL1~DLn), and the voltage generator 140 may generate the reference voltage. For example, in a display operation of displaying an image on the display panel 110, common pixel control signals may be applied to the pixels (PXLs), and the voltage generator 140 may generate the pixel control signals. In embodiments, the voltage generator 140 may provide the pixel control signals to the pixels (PXLs) through pixel control lines (PXCLs).

FIG. 2 shows that the pixel control lines (PXCLs) are connected between the voltage generator 140 and the display panel 110, but embodiments are not limited thereto. For example, the pixel control lines (PXCLs) may be connected between the scan driver 160 and the display panel 110. In this case, the pixel control signals may be transmitted from the voltage generator 140 to the pixel control lines (PXCLs) through the scan driver 160.

The controller 150 may control operations of the display device 1. The controller 150 may receive input image data (IMG) from an external source (e.g., a host) and a control signal (CTRL) for controlling its display. In response to the control signal (CTRL), the controller 150 may generate the scan control signal (SCS), the data control signal (DCS), and the voltage control signal (VCS). The controller 150 may convert the input image data (IMG) to be suitable for the display device 1 or the display panel 110 and output the image data (DATA). In embodiments, the controller 150 may align the input image data (IMG) to suitably fit sub-pixels (SPs) in a row unit and output the image data (DATA).

Two or more of the data driver 130, the voltage generator 140, or the controller 150 may be mounted on one integrated circuit. In embodiments, the data driver 130, the voltage generator 140, and the controller 150 may be included in a driver integrated circuit. In this case, the data driver 130, the voltage generator 140, and the controller 150 may be functionally separate components within a single driver integrated circuit. In other embodiments, at least one of the data driver 130, the voltage generator 140, or the controller 150 may be provided as distinct components from the driver integrated circuit.

The display device 1 may include at least one temperature sensor 300. The temperature sensor 300 may be configured to sense ambient temperature of the display device and generate temperature information (TEP) indicating the detected temperature. In embodiments, the temperature sensor 300 may be placed adjacent to the display panel 110 and/or the display driver 210. In other embodiments, the temperature sensor 300 may be placed adjacent to the sensor array 120 and/or the sensor driver 220. The temperature sensor 300 may be used to detect touch input errors (e.g., ghost touches) as described herein.

The controller 150 may control various actions of the display device 1 in response to the temperature information (TEP). In embodiments, the controller 150 may adjust brightness of the image output from display panel 110 in response to the temperature information (TEP). For example, the controller 150 may adjust the data signals and the first and second power supply voltages by controlling components such as the data driver 130 and/or the voltage generator 140.

Figure 3:
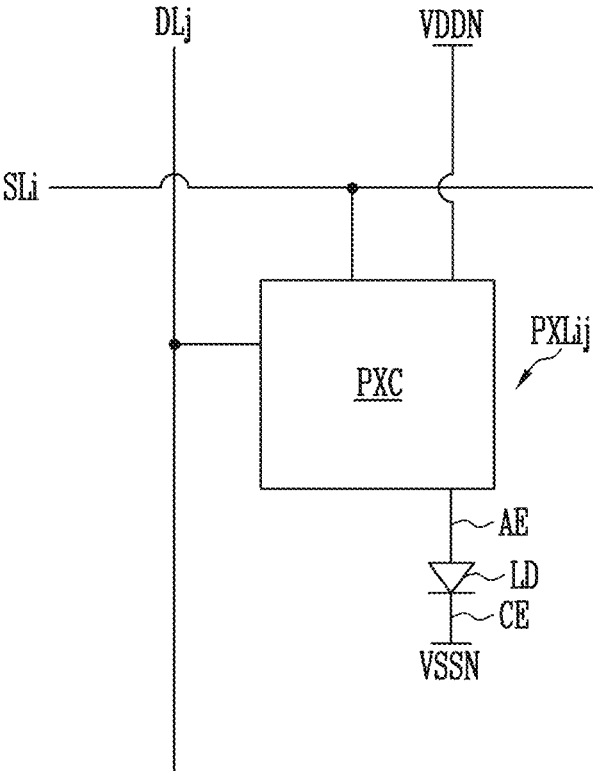
FIG. 3 is a circuit diagram illustrating an embodiment of a pixel included in the display panel of FIG. 1.

FIG. 3 is a circuit diagram illustrating an embodiment of a pixel PXLij which may be representative of any of the pixels PXL included in the display panel of FIG. 1. In FIG. 3, pixel (PXLij) is arranged in an i-th row (i is an integer greater than or equal to 1 and less than or equal to m) and a j-th column (j is an integer greater than or equal to 1 and less than or equal to n) among the pixels (PXLs) of FIG. 2.

Referring to FIG. 2, the pixel (PXLij) may include a pixel circuit (PXC) and a light-emitting element (LD). The light-emitting element (LD) may be connected between a first power supply voltage node (VDDN) and a second power supply voltage node (VSSN). The first power supply voltage node (VDDN) may be connected to one of the power lines (PLs) of FIG. 2 to receive the first power supply voltage. The second power supply voltage node (VSSN) may be connected to another of the power lines (PLs) of FIG. 2 to receive the second power supply voltage. The first supply voltage may have a higher voltage level than the second power supply voltage.

The light-emitting element (LD) may be connected between an anode electrode (AE) and a cathode electrode (CE). The anode electrode (AE) may be connected to the first power supply voltage node (VDDN) through the pixel circuit (PXC). For example, the anode electrode (AE) may be connected to the first power supply voltage node (VDDN) through one or more transistors (e.g., at least a driving transistor) included in the pixel circuit (PXC). The cathode electrode (CE) may be connected to the second power supply voltage node (VSSN). The light-emitting element (LD) is configured to emit light according to current flowing from the anode electrode (AE) to the cathode electrode (CE).

The pixel circuit (PXC) may be connected to an i-th scan line (SLi) of the first to m-th scan lines (SL1~SLm) of FIG. 2 and to a j-th data line (DLj) of the first to n-th data lines (DL1~DLn) of FIG. 2. In response to the scan signal received through the i-th scan line (SLi), the pixel circuit (PXC) may control the light-emitting element (LD) to emit light according to the data signal received through the j-th data line (DLj). In embodiments, the pixel circuit (PXC) may be further connected to the pixel control lines (PXCLs) of FIG. 2. In this case, the pixel circuit (PXC) may control the light-emitting element (LD) in further response to the pixel control signals received through the pixel control lines (PXCL).

For these operations, the pixel circuit (PXC) may include circuit elements, such as transistors and one or more capacitors. The transistors in the pixel circuit (PXC) may include P-type transistors and/or N-type transistors. In embodiments, the transistors of the pixel circuit (PXC) may include metal oxide silicon field effect transistors (MOSFETS). In embodiments, the transistors of the pixel circuit (PXC) may include amorphous silicon semiconductors, monocrystalline silicon, polycrystalline silicon semiconductors, and oxide semiconductors.

Figure 4:
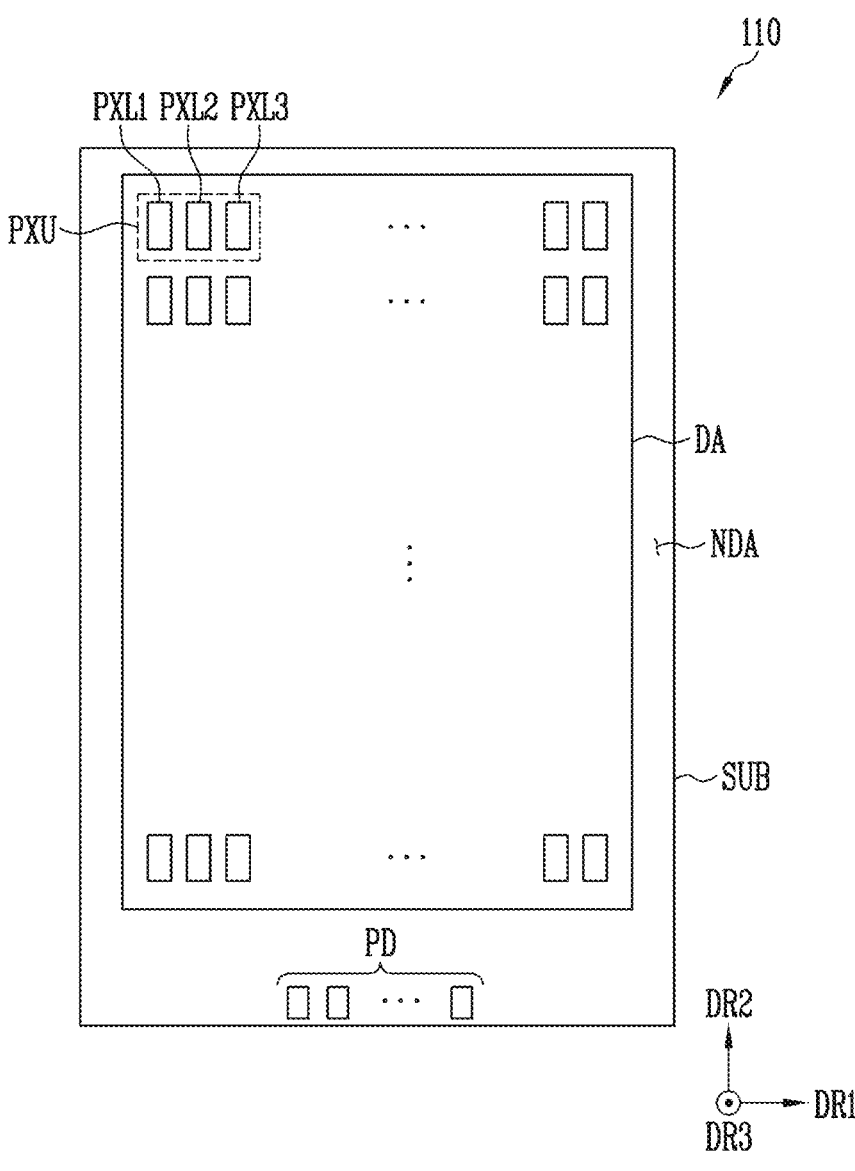
FIG. 4 is a plan view illustrating an embodiment of the display panel of FIG. 1.

FIG. 4 is a plan view illustrating an embodiment of the display panel 110 of FIG. 1.

Referring to FIG. 4, the display panel 110 may include a substrate (SUB), the pixels (PXLs), and pads (PDs). The pixels (PXLs) may be placed in the display area (DA) on the substrate (SUB). The pixels (PXLs) may be arranged in a predetermined (e.g., matrix) form along a first direction (DR1) and a second direction (DR2) intersecting the first direction (DR1). However, embodiments are not limited thereto. For example, the pixels (PXLs) may be arranged in a zigzag pattern along the first direction (DR1) and the second direction (DR2). For example, the pixels (PXLs) may be arranged in a pentile (PENTILE™) shape. In one embodiment, the pixels (PXLs) may be formed in a circular pattern.

The pixels may be disposed to form pixel units (PXU). For example, two or more pixels (PXLs) of the pixel (PXLs) may form a single pixel unit (PXU). In one embodiment, three or more pixels (PXLs) may form a single pixel unit (PXU). In some ways, each of the pixels PXL may be considered to be a sub-pixel of a pixel unit (PXU).

In the non-display area (NDA) on the substrate (SUB), a component may be placed to control the pixels (PXLs). For example, wires connected to the pixels (PXLs), such as the first to m-th scan lines (SL1~SLm) and the first to n-th data lines (DL1~DLn) of FIG. 2, may extend in the non-display area (NDA).

At least one of the scan driver 160, the data driver 130, the voltage generator 140, or the controller 150 of FIG. 2 may be disposed in the non-display area (NDA) of the display panel 110. In embodiments, the scan driver 160 of FIG. 2 may be mounted on the display panel 110 and placed in the non-display area (NDA). In other embodiments, the scan driver 160 may be implemented as an integrated circuit distinct from the display panel 110.

In addition, pads (PDs) may be placed in the non-display area (NDA) on the substrate (SUB). The pads (PDs) may be electrically connected to the pixels (PXLs) through corresponding wires. For example, the pads (PDs) may be connected to the pixels (PXLs) through the first to n-th data lines (DL1~DLn).

The pads (PDs) may serve as an interface between the display panel 110 and other components of the display device 1 (e.g., see FIG. 1). In embodiments, voltages and signals for operating components included in the display panel 110 may be provided through the pads (PDs). For example, the first to n-th data lines (DL1~DLn) may be connected to the driver integrated circuit through the pads (PDs). For example, the first and second power supply voltages may be received through the pads (PDs) from the driver integrated circuit. For example, in the case that the scan driver 160 is mounted on the display panel 110, the scan control signal (e.g., SCS, see FIG. 2) may be transmitted from the driver integrated circuit to the scan driver 160 through the pads (PDs).

In embodiments, a circuit board may be electrically connected to the pads (PDs) using a conductive adhesive member, such as an anisotropic conductive film. In this case, the circuit board may be a flexible circuit board (FPCB) or a flexible film made of a flexible material. The driver integrated circuit may be mounted on the circuit board and electrically connected to the pads (PDs).

In embodiments, the display panel 110 may have a flat display surface. In other embodiments, the display panel 110 may have an at least partially round or curved display surface. In embodiments, the display panel 110 may be bendable, foldable, or rollable. In these cases, the display panel 110 and/or the substrate (SUB) may include materials having flexible properties.

Figure 5:
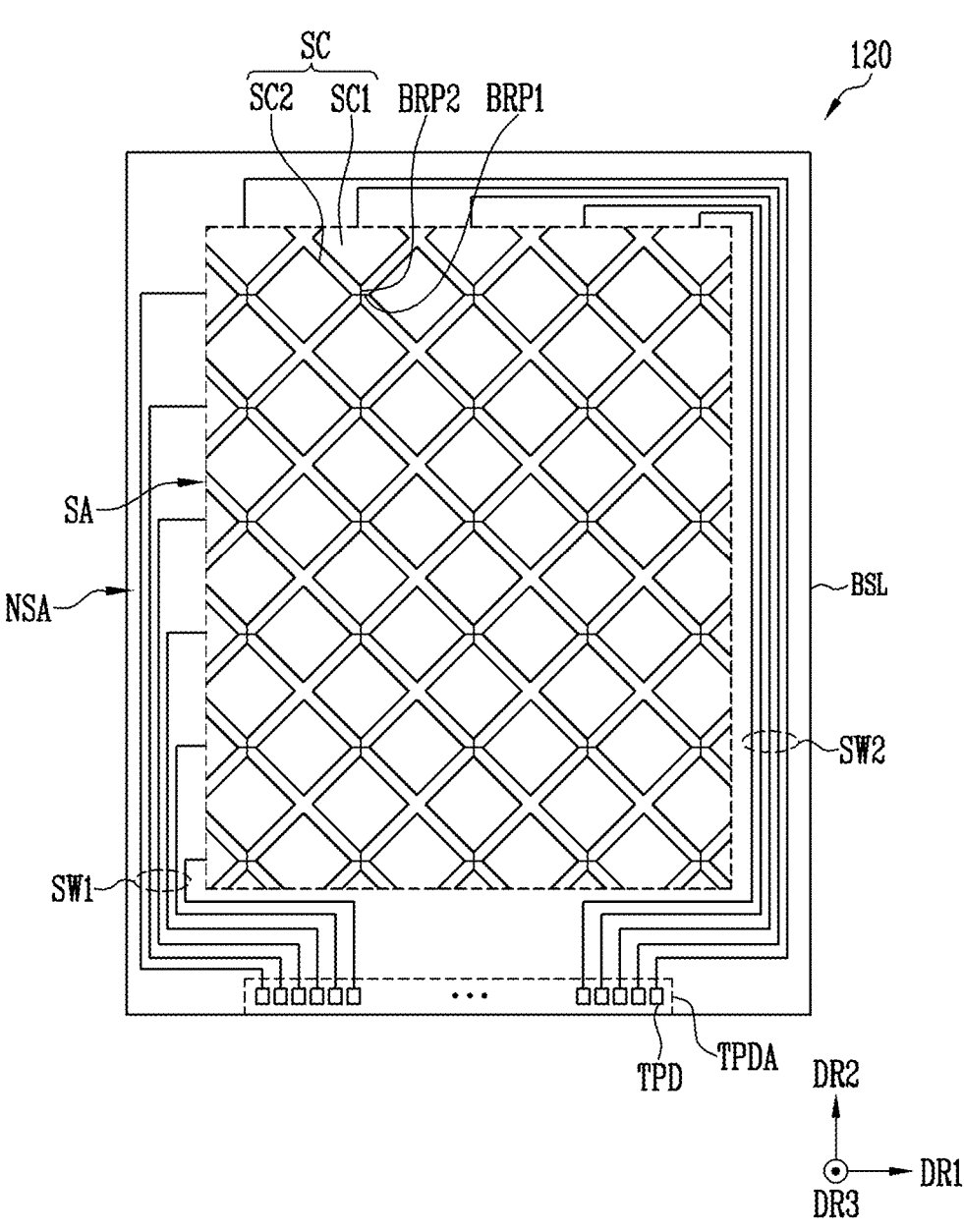
FIG. 5 is a plan view illustrating an embodiment of a sensor array of FIG. 1.

FIG. 5 is a plan view illustrating an embodiment of the sensor array 120 of FIG. 1.

Referring to FIG. 5, the sensor array 120 may include a base layer (BSL) including either the sensor area (SA) (or, a sensing area, an active area) or the non-sensor area (NSA) (or, a non-sensing area).

The base layer (BSL) may include tempered glass, transparent plastic, or a transparent film.

The sensor area (SA) may be disposed in a central area of the base layer (BSL) to overlap the display area (e.g., DA, see FIG. 4). The sensor area (SA) may be provided with a geometry which is substantially identical to the geometry of the display area (DA), but the geometries may be different in other embodiments. The sensor area (SA) may detect a touch input. In the sensor area (SA), the sensor electrodes (SCs) may be provided and/or formed for detecting the touch input.

The non-sensor area (NSA) may be provided in a peripheral area of the base layer (BSL) so that it overlaps the non-display area (e.g., NDA, see FIG. 4). The peripheral area may entirely or partially surround the central area of the base layer (BSL). In the non-sensor area (NSA), sensing wires (SW1, SW2) may be provided and/or formed electrically connected to the sensor electrodes (SCs) to receive and transmit sensing signals.

The non-sensor area (NSA) may also include a touchpad area (TPDA) which is connected to the sensing wires (SW1, SW2) and electrically connected to the sensor electrodes (SCs) in the sensor area (SA). The touchpad area (TPDA) may include touchpads (TPDs). The sensing wires may include a plurality of first sensing wires (SW1) and a plurality of second sensing wires (SW2) connected to respective ones of the touchpads (TPDs).

The sensor electrodes (SCs) may include first sensor electrodes (SC1) and second sensor electrodes (SC2) electrically insulated from the first sensor electrodes (SC1). The first sensor electrodes (SC1) are arranged in the second direction (DR2) and are electrically connected to adjacent first sensor electrodes (SC1) through a second bridge pattern (BRP2) to form at least one sensor row. The second sensor electrodes (SC2) are arranged in the first direction (DR1) intersecting the second direction (DR2) and are electrically connected to adjacent second sensor electrodes (SC2) through a first bridge pattern (BRP1) to form at least one sensor row.

The sensor electrodes (SCs) may be electrically connected to the touchpads (TPDs) through the corresponding sensing wires. For example, the first sensor electrodes (SC1) may be electrically connected to the touchpads (TPD) through the second sensing wires (SW2), and the second sensor electrodes (SC2) may be electrically connected to the touchpads (TPD) through the first sensing wires (SW1).

The first sensor electrodes (SC1) may be driving electrodes receiving a driving signal for detecting a touch position within the sensor area (SA). The second sensor electrodes (SC2) may be sensing electrodes outputting a sensing signal for detecting the touch position within the sensor area (SA). However, the present disclosure is not limited thereto. For example, the first sensor electrodes (SC1) may be the sensing electrodes and the second sensor electrodes (SC2) may be the driving electrodes.

Figure 6:
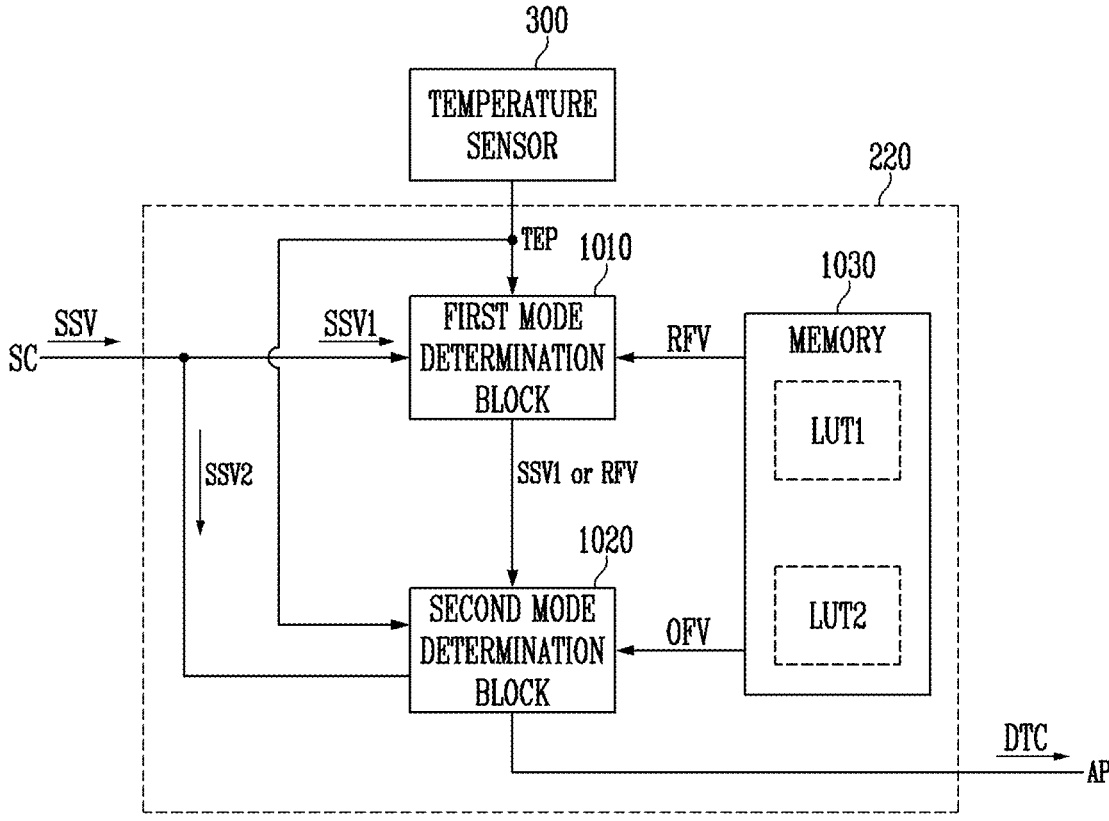
FIG. 6 is a block diagram illustrating an embodiment of a sensor driver of FIG. 1.

FIG. 6 is a block diagram illustrating an embodiment of the sensor driver 220 of FIG. 1.

Referring to FIGS. 1 and 6, the sensor driver 220 may include a first mode determination block 1010, a second mode determination block 1020, and a memory 1030. The first mode determination block 1010 and the second mode determination block 1020 may be implemented in hardware, software, or both. The sensor driver 220 may be used to determine whether a touch input is an actual touch input or a false (or ghost) touch based on temperature information output from the temperature sensor 300.

The first mode determination block 1010 may determine whether a first sensing value (SSV1) input in the touch release state is an actual touch input. The first mode determination block 1010 may be applied in the touch release state. For example, the first mode determination block 1010 may receive from the application processor 30 information indicating whether the display device is operating in a touch release state or a touch state. As another example, the first mode determination block 1010 may directly determine whether the touch release state or the touch state exists by acquiring an amount of change per hour of previous sensing values.

The first mode determination block 1010 may obtain the first sensing value (SSV1) based on the sensing signals provided from the sensor electrodes (SCs) in the touch release state. Here, the first sensing value (SSV1) may refer to capacitances which are formed between the sensor electrodes (SCs) or at the sensor electrodes (SCs). For example, the first sensing value (SSV1) may be a mutual capacitance formed between the first sensor electrodes (SC1) and the second sensor electrodes (SC2) and measured by the sensor driver (220) in the absence of a user input. As another example, the first sensing value (SSV1) may be a self-capacitance of each of the first sensor electrodes (SC1) and/or the second sensor electrodes (SC2) in the absence of user input.

The first mode determination block 1010 may receive the temperature information (TEP) corresponding to the ambient temperature of the sensor array 120 from the temperature sensor 300. Then, the first mode determination block 1010 may receive a reference value (REF) corresponding to the sensed temperature from the memory 1030 based on the temperature information (TEP). In memory 1030, a reference capacitance of each of the sensor electrodes (SCs) corresponding to sensed temperature may be stored as a first lookup table (LUT1). When the first mode determination block 1010 receives information indicative of a first temperature from the temperature sensor 300, it may receive a first reference value corresponding to the first temperature from the memory 1030.

The first mode determination block 1010 may compare the first sensing value (SSV1) with the reference value (RFV) corresponding to the temperature information (TEP) to determine whether the first sensing value (SSV1) includes an error, e.g., whether there is a ghost touch. For example, when a difference between the first sensing value (SSV1) and the reference value (RFV) corresponding to the temperature information (TEP) exceeds a reference range, the first mode determination block 1010 may determine that the first sensing value (SSV1) includes an error. In other words, the first mode determination block 1010 may determine that the first sensing value (SSV1) is a ghost touch rather than an actual touch input. For example, when the first sensing value (SSV1) is greater than the reference value (RFV) by approximately 5% or more, the first mode determination block 1010 may determine that the first sensing value (SSV1) includes an error. However, embodiments are not limited to 5% and may use a different percentage in another embodiment.

In the case that it is determined that the first sensing value (SSV1) includes an error, the first mode determination block 1010 may transmit the reference value (RFV) corresponding to the temperature information (TEP), instead of the first sensing value (SSV1), to the second mode determination block 1020.

In one embodiment, when the difference between the first sensing value (SSV1) and the reference value (RFV) corresponding to the temperature information (TEP) is within the reference range, the first mode determination block 1010 may determine that the first sensing value (SSV1) includes no error. For example, the first mode determination block 1010 may determine that the first sensing value (SSV1) is an actual touch input. For example, when the difference between the first sensing value (SSV1) and the reference value (RFV) is within approximately 5%, the first mode determination block 1010 may determine that the first sensing value (SSV1) includes no error. However, as previously indicated, embodiments are not limited to the 5% reference range.

In the case that it is determined that the first sensing value (SSV1) includes no error, the first mode determination block 1010 may transmit the first sensing value (SSV1) to the second mode determination block 1020.

The second mode determination block 1020 may detect a touch input by using an offset value (OFV) corresponding to the temperature information (TEP) from a second sensing value (SSV2) input in the touch state.

The second mode determination block 1020 may obtain the second sensing value (SSV2) based on the sensing signals provided from the sensor electrodes (SCs) in the touch state, which may occur immediately after the touch release state is released. The second sensing value (SSV2) may correspond to the first sensing value (SSV1) and may refer to the capacitances formed between the sensor electrodes (SCs) or at the sensor electrodes (SCs). For example, the second sensing value (SSV2) may be the mutual capacitance formed between the first sensor electrodes (SC1) and the second sensor electrodes (SC2) and measured by the sensor driver 220 in the presence of a user input. In one embodiment, the second sensing value (SSV2) may be the self-capacitance of each of the first sensor electrodes (SC1) and/or the second sensor electrodes (SC2) in the presence of the user input.

The second mode determination block 1020 may receive either the first sensing value (SSV1) or the reference value (RFV) from the first mode determination block 1010 depending on the level of the temperature sensed by temperature sensor 300, e.g., depending on a comparison of the first sensing value (SSV1) and the reference value corresponding to the sensed temperature. The second mode determination block 1020 may detect a touch input based on one of the first sensing value (SSV1) or the reference value (REF), and the second sensing value (SSV2).

For example, if it is determined that the first sensing value (SSV1) includes an error, in the touch state occurring immediately after the touch release state is released, the second mode determination block 1020 may detect the touch input based on the difference between the reference value (RFV) and the second sensing value (SSV2). For example, if it is determined that the first sensing value (SSV1) includes no error, in the touch state occurring immediately after the touch release state is released, the second mode determination block 1020 may detect the touch input based on the difference between the first sensing value (SSV1) and the second sensing value (SSV2). For example, the second mode determination block 1020 may detect the touch input when the change in capacitance between the first sensing value (SSV1) and the second sensing value (SSV2) corresponding to the first sensing value (SSV1) is greater than a reference threshold. Here, the reference threshold may be a value at which the sensor driver 220 determines the touch input at room temperature.

The second mode determination block 1020 may receive the temperature information (TEP) for the ambient temperature of the sensor array 120 from the temperature sensor 300. Then, the second mode determination block 1020 may receive the offset value (OFV) corresponding to the temperature from the memory 1030 determined based on the temperature information (TEP). In the memory 1030, the offset value (OFV) corresponding to the temperature may be stored in a second lookup table (LUT2), which, for example, may be provided separately from the first lookup table (LUT1). For example, when the second mode determination block 1020 receives a first temperature from the temperature sensor 300, it may receive a first offset value corresponding to the first temperature from the memory 1030.

The second mode determination block 1020 may perform correction by applying the offset value (OFV) corresponding to the temperature information (TEP) to one of the first sensing value (SSV1) or the reference value (RFV) output from the first mode determination block 1010, and the second sensing value (SSV2). In one embodiment, the first and second sensing values (SSV1, SSV2), and the reference value (RFV) are capacitances that may change with temperature variations. For example, if the temperature drops below a reference temperature, the overall capacitance may be lowered at all locations in the sensor array 120. The capacitances of the first and second sensing values (SSV1, SSV2) may be proportional to a dielectric constant of an insulator disposed between the first sensor electrodes (SC1) and the second sensor electrodes (SC2). Further, as the dielectric constant changes with temperature variations, the capacitances of the first and second sensing values (SSV1, SSV2) may change. Therefore, in order to reflect the characteristics of the capacitance changing depending on the temperature, the second mode determination block 1020 may correct the first and second sensing values (SSV1, SSV2) by applying the offset value (OFV) corresponding to the temperature information (TEP).

For example, if it is determined that the first sensing value (SSV1) includes an error, the second mode determination block 1020 may generate a correction reference value by multiplying the reference value (RFV) by the offset value (OFV) corresponding to the temperature. The second mode determination block 1020 may generate a second correction sensing value by multiplying the second sensing value (SSV2) obtained in the touch state immediately after the touch release state is released by the offset value (OFV) corresponding to the temperature. The second mode determination block 1020 may detect the touch input according to a difference between the correction reference value and the second correction sensing value.

As another example, if it is determined that the first sensing value (SSV1) includes no error, the second mode determination block 1020 may multiply the first sensing value (SSV1) output from the first mode determination block 1010 by the offset value (OFV) corresponding to the temperature to generate a first correction sensing value. The second mode determination block 1020 may generate the second correction sensing value by multiplying the second sensing value (SSV2) obtained in the touch state immediately after the touch release state is released by the offset value (OFV) corresponding to the temperature. The second mode determination block 1020 may detect the touch input according to a difference between the first correction sensing value and the second correction sensing value. The second mode determination block 1020 may transmit information about the detected touch input (DTC) to the application processor 30.

Figure 7:
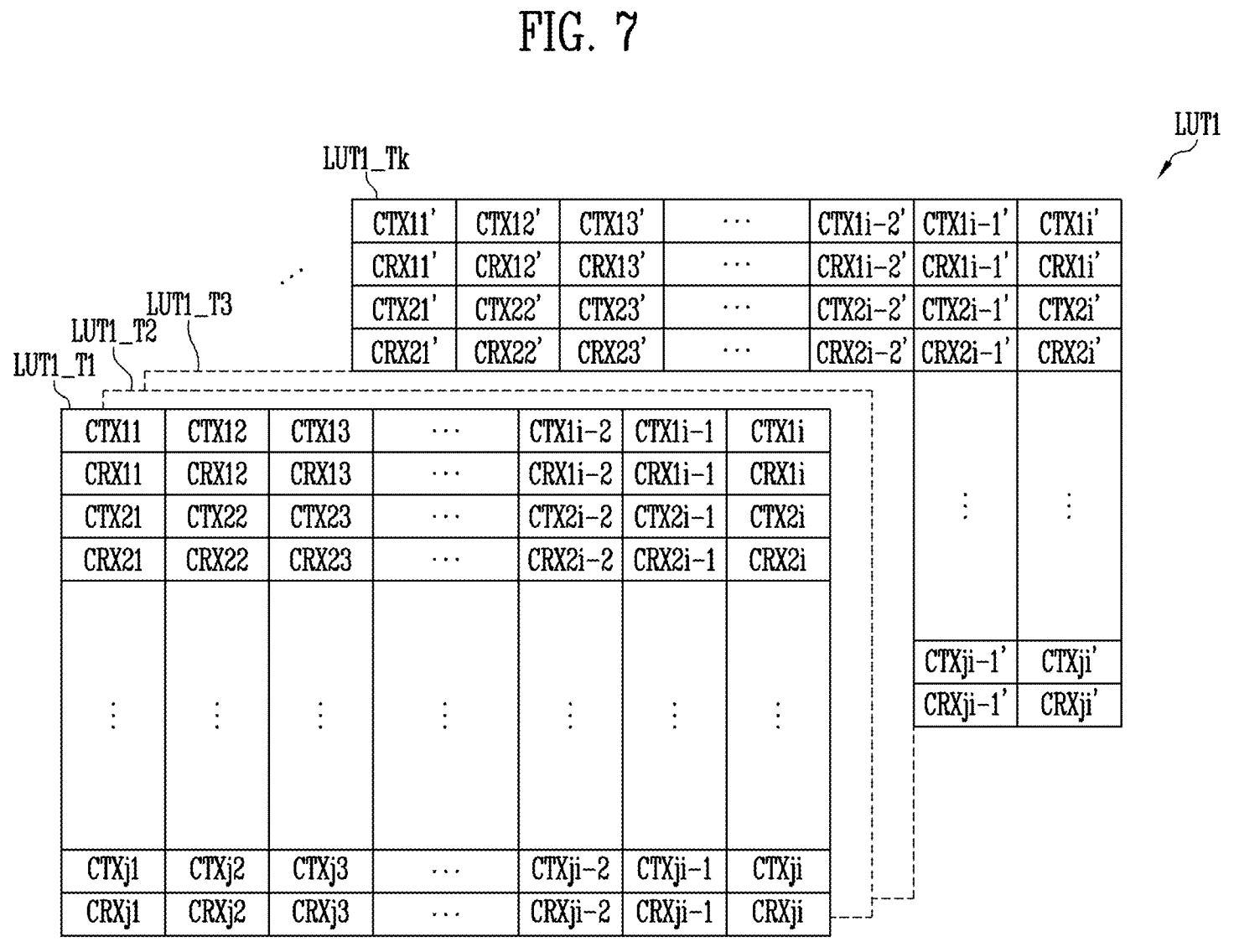

FIG. 7 is a diagram illustrating an embodiment of a lookup table which stores reference values corresponding to different temperatures of FIG. 6.

Referring to FIGS. 6 and 7, the memory 1030 may include a first lookup table (LUT1) which stores reference values (RFV) corresponding to different temperatures of the sensor array 120. The first lookup table (LUT1) may be stored in the memory 1030 in the sensor driver 220. For example, the memory 1030 may be a non-volatile memory, such as an electrically EPROM (EEPROM) or a flash memory. Here, the reference values (RFV) stored in the first lookup table (LUT1) may be values stored in advance before product shipment, or may be values that are newly stored during product use.

The first lookup table (LUT1) may include first to k-th sub-lookup tables (LUT1_T1~LUT1_Tk). Each of the first to kth sub-lookup tables (LUT1_T1 to LUT1_Tk) may store characteristics of the sensor electrodes (e.g., SCs, see FIG. 5) corresponding to each of a plurality of temperatures. For example, the first sub-lookup table (LUT1_T1) may store first capacitances (CTX11~CRXji) of the sensor electrodes (SCs) corresponding to a first temperature. The second sub-lookup table (LUT1_T2) may store the capacitances of the sensor electrodes (SCs) corresponding to a second temperature. The third sub-lookup table (LUT1_T3) may store the capacitances of the sensor electrodes (SCs) corresponding to a third temperature. The k-th sub-lookup table (LUT1_Tk) may store capacitances (CTX11'~CRXji') of the sensor electrodes (SCs) corresponding to a k-th temperature. Here, the first to k-th temperatures may be different temperatures set in predetermined (e.g., 5° C.) increments from a first predetermined temperature (e.g., −25° C.) to a second predetermined temperature (e.g., +50° C.). For example, the first to k-th sub-lookup tables (LUT1_T1~LUT1_Tk) may be configured for −25° C., −20° C., . . . , 0° C., . . . , 45° C., and 50° C., respectively, and sequentially store the capacitances of the sensor electrodes (SCs) corresponding to each. However, embodiments are not limited to this.

The first to K-th sub-lookup tables (LUT1_T1~LUT1_Tk) may correspond to the sensing signal received from the sensor electrodes (SCs) when the temperature of the sensor array 120 is first to K-th temperatures, respectively. In one embodiment, each of the first to k-th sub-lookup tables (LUT1_T1~LUT1_Tk) may store the capacitance corresponding to each of the sensor electrodes (SCs) as the reference value (RFV) when the temperature is the first to k-th temperatures.

The first to k-th sub-lookup tables (LUT1_T1~LUT1_Tk) may store the reference value (RFV) for determining whether the sensing value of the sensing signal received from the sensor electrodes (SCs) at a particular temperature is an actual touch input. For example, the first sub-lookup table (LUT1_T1) may store the reference value (RFV) at the first temperature. The k-th sub-lookup table (LUT1_Tk) may store the reference value (RFV) at the k-th temperature. The number of reference values (RFVs) included in the first sub-lookup table (LUT1_T1) and the k-th sub-lookup table (LUT1_Tk) may be the same or different.

The first mode determination block 1010 shown in FIG. 6 may select one of the first to k-th sub-lookup tables (LUT1_T1~LUT1_Tk) according to the temperature information (TEP) received from the temperature sensor 300 in the touch release state. Then, the first mode determination block 1010 may compare the first sensing value (SSV1) received from the sensor electrodes (SCs) with the reference value (RFV) corresponding to the first sensing value (SSV1) in the selected sub-lookup table. If the difference between the first sensing value (SSV1) and the reference value (RFV) corresponding to the first sensing value (SSV1) exceeds the reference range, the first mode determination block 1010 may output the reference value (RFV) to the second mode determination block 1020. If the difference between the first sensing value (SSV1) and the reference value (RFV) corresponding to the first sensing value (SSV1) is within the reference range, the first mode determination block 1010 may output the first sensing value (SSV1) to the second mode determination block 1020.

As such, the reference value (RFV) stored in each of the first to k-th sub-lookup tables (LUT1_T1~LUT1_Tk) may be a value for determining whether the sensing value is an actual touch input in the touch release state. Therefore, the sensor driver 220 uses the reference value (RFV) to determine whether the sensing value is an actual touch input, so that it may stably detect the touch input without being affected by (e.g., without being determined as) a ghost touch caused by temperature change in the touch release state.

FIG. 8 is a diagram illustrating an operation of the sensor driver 220 in a touch release state of FIG. 6. Referring to FIGS. 6 and 8, an operation of comparing the first sensing value (SSV1) and the reference value (RFV) in the touch release state in the first mode determination block 1010 may be shown.

The first mode determination block 1010 may obtain the first sensing value (SSV1) at the first temperature from the sensor electrodes (SCs), as shown in a first sensing table (SS_T1). The first mode determination block 1010 may receive the first sub-lookup table (LUT1_T1) from the memory 1030 based on the sensed temperature information (TEP). The first mode determination block 1010 may compare the first sensing table (SS_T1) with the first sub-lookup table (LUT1_T1). Based on a result of the comparison, it may be determined whether the first sensing table (SS_T1) includes an error area (ERA), e.g., one corresponding to a ghost touch.

For example, the first mode determination block 1010 may determine that an error is included if the difference between the sensing value of the first sensing table (SS_T1) and the reference value of the first sub-lookup table (LUT1_T1) with respect to the same sensor electrode exceeds a predetermined percentage, e.g., 5%. For example, the error area (ERA) may be an area (see cross-hatching) where the difference between the sensing value of the first sensing table (SS_T1) and the reference value of the first sub-lookup table (LUT1_T1) exceeds 5%. The error area (ERA) is the area in which the reference range is exceeded, and the sensing value of the error area (ERA) may be determined to be a ghost touch rather than an actual touch input. Accordingly, the first mode determination block 1010 may determine that the first sensing value (SSV1) at the first temperature includes an error corresponding to the error area (ERA). The error area (ERA) is shown to include multiple entries (see cross-hatching), but may include only one entry in another embodiment.

If it is determined that the first sensing table (SS_T1) includes an error area (ERA), the first mode determination block 1010 may transmit the first sub-lookup table (LUT1_T1) to the second mode determination block 1020 instead of the first sensing table (SS_T1). Accordingly, the second mode determination block 1020 may sense the touch input based on the first sub-lookup table (LUT1_T1).

Figure 9:
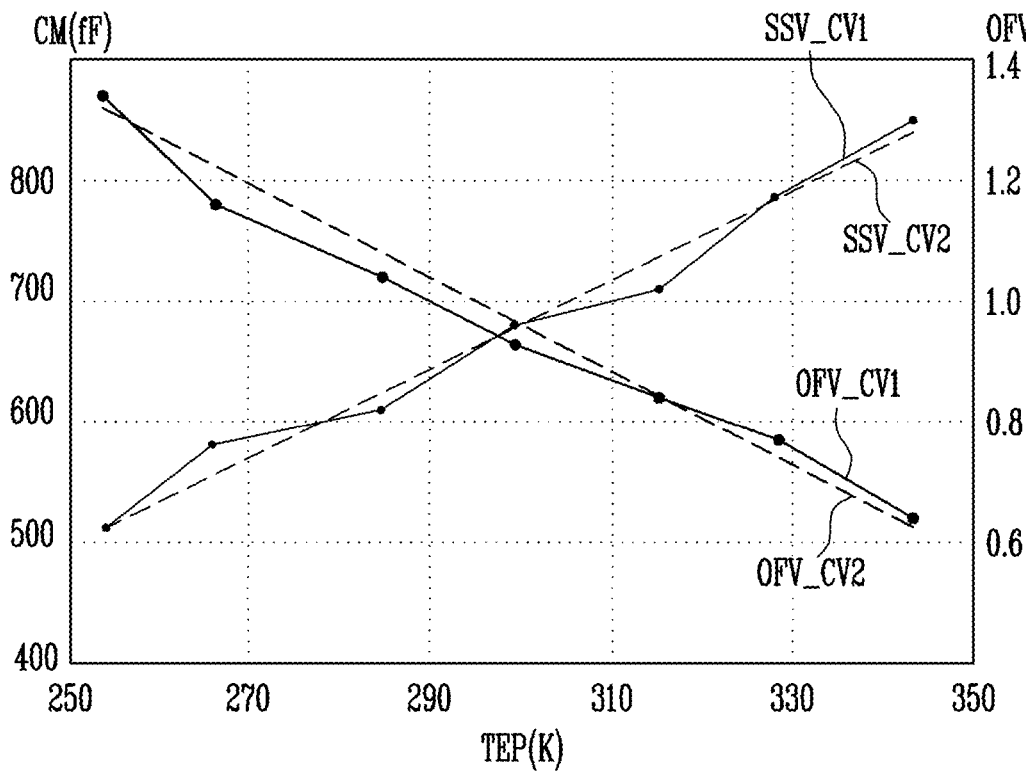
FIG. 9 is a graph showing an embodiment of offset values corresponding to the temperature of FIG. 6.

FIG. 9 is a graph showing an embodiment of the offset value corresponding to the temperature of FIG. 6.

Referring to a sensing value curve (SSV_CV1) of FIG. 9, the capacitance may be directly proportional to ambient temperature, e.g., the capacitance may decrease as the ambient temperature of the sensor array 120 decreases. In one embodiment, the capacitance may be proportional to the dielectric constant of the insulator placed between the sensor electrodes (e.g., SCs, see FIG. 5). As ambient temperature decreases, the dielectric constant decreases, and the capacitance may also decrease. In this case, the horizontal axis represents the absolute temperature (K), and the left vertical axis may represent the capacitance of the sensor array 120 corresponding to the temperature. Additionally, the sensing value graph (SSV_CV1) may be linearly approximated from the a minimum capacitance value to a maximum capacitance and represented as a sensing value linear curve (SSV_CV2).

Referring to an offset value curve (OFV_CV1) of FIG. 9, the offset value may be set to compensate for characteristics of the capacitance which varies with temperature. The offset value may be indirectly proportional to ambient temperature, e.g., as the ambient temperature of the sensor array 120 decreases, the offset value may increase. In this case, the horizontal axis represents the absolute temperature (K), and the right vertical axis may represent the offset value corresponding to the temperature. Additionally, the offset value curve (OFV_CV1) may be linearly approximated from a minimum offset value to a maximum offset value and represented as an offset value linear curve (OFV_CV2).

Referring to FIG. 9, as shown by the sensing value curve (SSV_CV1), as the ambient temperature of the sensor array 120 decreases lower than room temperature, the capacitance may decrease relative to room temperature. As a result, even if the same touch input occurs, the change in capacitance may be less than the reference threshold for detecting the touch input. In this case, even if the touch input occurs, the sensor driver 220 may erroneously determine that no touch input has occurred. Therefore, as the temperature of the sensor array 120 decreases lower than room temperature, the offset value (OFV) for compensating for the capacitance may increase. The second mode determination block 1020 may increase the amount of change in capacitance by applying the offset value (OFV) greater than 1 to the sensing value when the ambient temperature of the sensor array (120) is lower than room temperature.

As the ambient temperature of the sensor array (120) increases higher than room temperature, the electrostatic capacitance may increase relative to room temperature. As a result, even if the same touch input occurs, the change in capacitance may be greater than the reference threshold for detecting the touch input. In this case, even if no touch input occurs, the sensor driver 220 may erroneously determine that a touch input has occurred. Therefore, as the temperature of the sensor array 120 increases higher than room temperature, the offset value (OFV) for compensating for the capacitance may decrease. The second mode determination block 1020 may reduce the amount of change in capacitance by applying the offset value (OFV) less than 1 to the sensing value when the ambient temperature of the sensor array 120 is higher than room temperature.

Figure 10:
FIG. 10 is a diagram showing an embodiment of a lookup table which stores the offset values corresponding to the temperature of FIG. 9.

FIG. 10 is a diagram illustrating an embodiment of a lookup table which stores offset values for different temperatures for FIG. 9.

Referring to FIG. 6, FIG. 9, and FIG. 10, the memory 1030 may include the second lookup table (LUT2) which stores the offset values (OFV) corresponding to different temperatures of the sensor array 120. The second lookup table (LUT2) may be stored, for example, in the memory 1030 in the sensor driver 220.

The second lookup table (LUT2) may store offset values (OFV) corresponding to different temperatures. The offset value (OFV) may be set according to the offset value curve (OFV_CV1) and the offset value line curve (OFV_CV2) of FIG. 9. For example, the offset values (OFV) stored in the second lookup table (LUT2) may be set as a ratio of a second reference value at room temperature (25° C.) to the first reference value at the particular temperature. Here, the first and second reference values are the reference values (RFVs) stored in the first lookup table (LUT1), which may be an average, a median, a mode, etc., of the capacitance of the sensor array 120.

In accordance with one embodiment, the offset value (OFV) may be set based on the capacitance of the sensor array 120 at a corresponding temperature and the capacitance of the sensor array 120 at room temperature (25° C.). The offset value (OFV) may be set to compensate for the capacitance at each temperature in a predetermined range, e.g., from −25° C. to +70° C. For example, the sensor array 120 may have a capacitance of 575 fF at −5° C. and 677 fF at 25° C. In this case, the capacitance at 25° C. may be 118% of the capacitance at −5° C., determined as a ratio of 677 fF to 575 fF. Thus, to compensate for this, the offset value (OFV) corresponding to −5° C. may be 1.18. The capacitance of the sensor array 120 may be 778 fF at 55° C. In this case, the capacitance at 25° C. may be 87% of the capacitance at 55° C., determined as a ratio of 677 fF to 778 fF. Therefore, to compensate for this, the offset value (OFV) corresponding to 55° C. may be 0.87.

In this way, the offset value (OFV) may be set to correspond to the ambient temperature of the display device 1. For example, to compensate for the capacitance of the sensor array 120 which changes with fluctuations in temperature, the offset value (OFV) at lower temperatures may be greater than the offset value (OFV) at higher temperatures.

Figure 11:
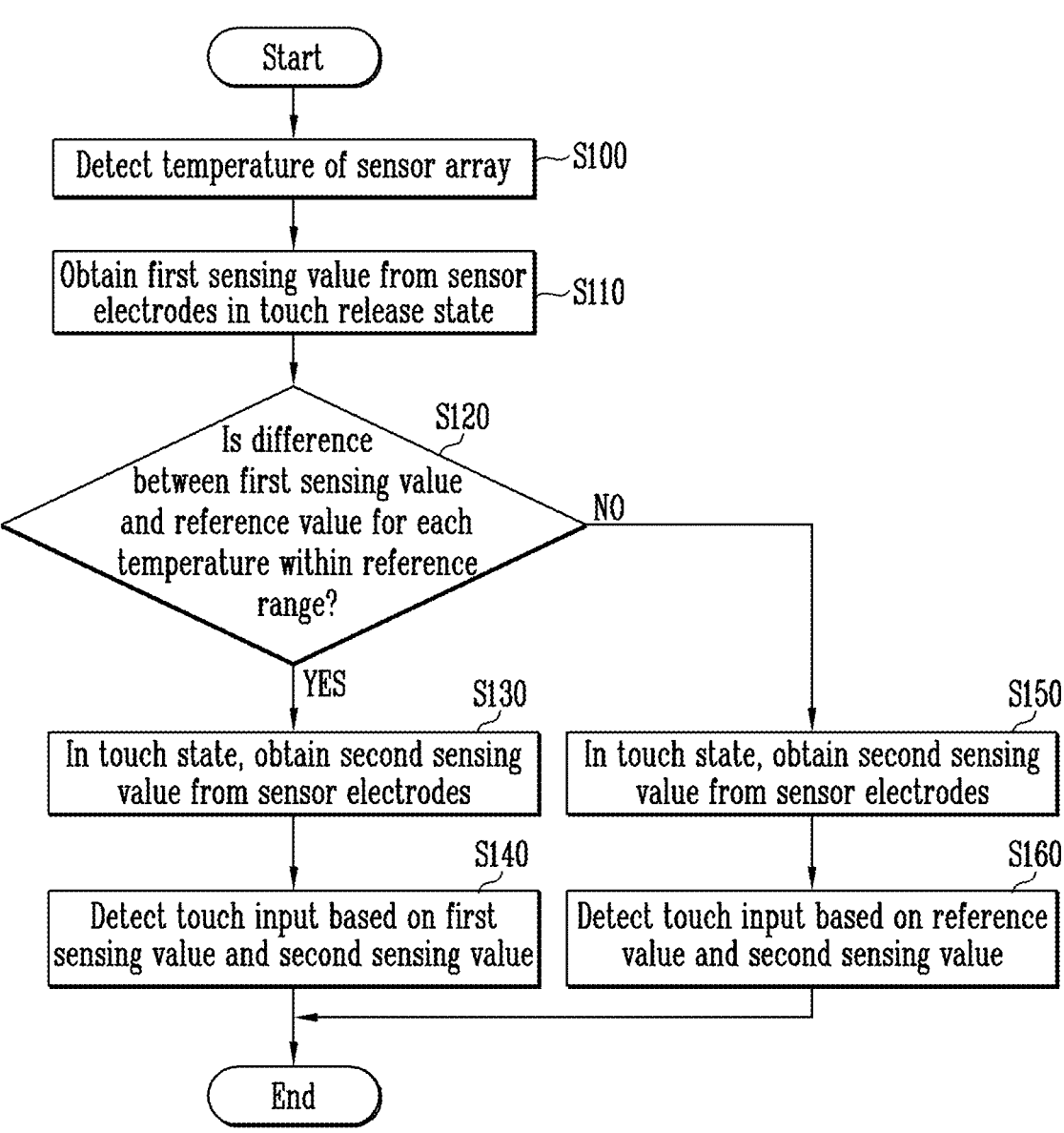
FIG. 11 is a flowchart illustrating an embodiment of a method of operating a display device according to embodiments of the present disclosure.

FIG. 11 is a flowchart illustrating an embodiment of a method of operating a display device according to embodiments of the present disclosure.

Referring to FIGS. 1 and 11, operations in the touch release state of the display device 1 and in the touch state occurring immediately after the touch release state is released may be illustrated.

In S100, the sensor driver 220 may detect the temperature of the sensor array 120. For example, the sensor driver 220 may receive temperature information detected from the temperature sensor 300, for example, when the display device 1 is operating in a touch release state.

In S110, the sensor driver 220 may receive a first sensing signal from the sensor electrodes (SCs) in the touch release state. The sensor driver 220 may acquire the first sensing value from the first sensing signal. Here, the first sensing value may be the capacitance. For example, when an object such as a user's finger is in close proximity to or in contact with the sensor electrodes (SCs), the capacitance of the sensor electrodes (SCs) may vary depending on the capacitance formed with the object's surface.

In S120, the sensor driver 220 may compare the first sensing value with the reference value stored in the memory 1030 for the detected temperature. The sensor driver 220 may determine whether a difference between the first sensing value and the reference value corresponding to the temperature detected from the temperature sensor 300 is within the reference range. As previously indicated, according to one embodiment the reference range may be set to 5%, but may be a different range in another embodiment. The sensor driver 220 may perform S130 and S140 if the difference between the first sensing value and the reference value is within the reference range. If the difference between the first sensing value and the reference value exceeds the reference range, it is possible that a touch input is not an actual touch input (e.g., is a ghost input) and the sensor driver 220 may perform S150 and S160.

In S130, the sensor driver 220 may receive a second sensing signal from the sensor electrodes (SCs) in the touch state immediately after the touch release state is released. The sensor driver 220 may calculate the second sensing value from the second sensing signal.

In S140, the sensor driver 220 may detect a touch input based on the first sensing value in the touch release state and the second sensing value of the touch state immediately after the touch release state is released. For example, the sensor driver 220 may detect the touch input by using the first sensing value as is, as it determines that the first sensing value is an actual touch input.

In S150, the sensor driver 220 may receive the second sensing signal from the sensor electrodes (SCs) in the touch state immediately after the touch release state is released. The sensor driver 220 may acquire the second sensing value (e.g., a capacitive value) from the second sensing signal.

In S160, the sensor driver 220 may detect the touch input based on the reference value corresponding to the temperature and the second sensing value in the touch state immediately after the touch release state is released. For example, the sensor driver 220 may ignore the first sensing value and detect the touch input using the reference value (e.g., RFV) corresponding to the detected temperature (instead of the first sensing value) when it determines that there is an error, e.g., that the first sensing value corresponds to a ghost touch rather than an actual touch input.

Figure 12:
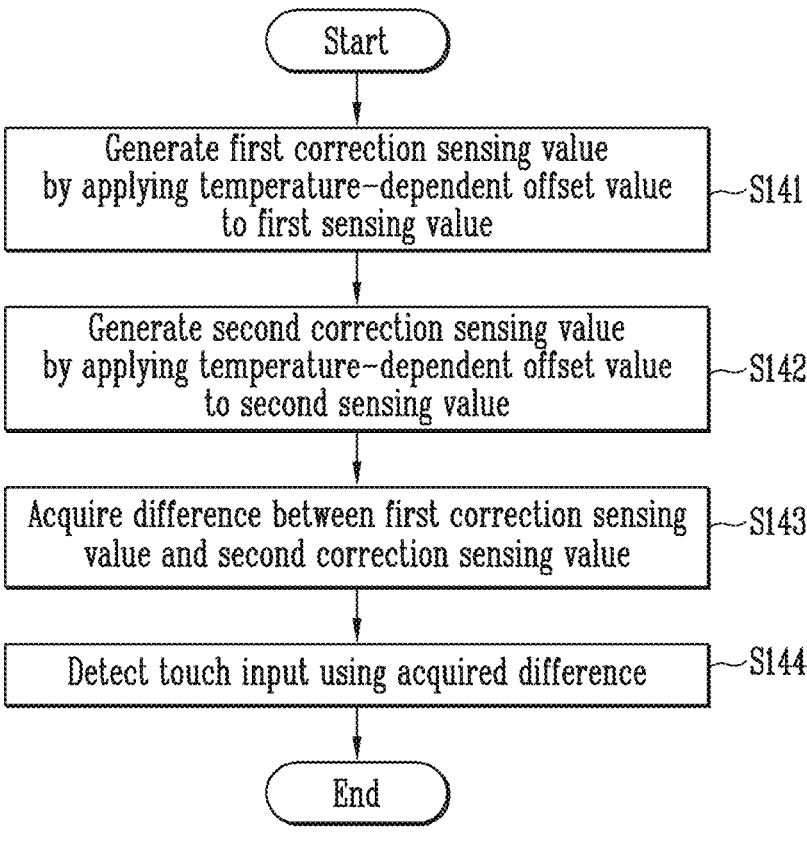
FIG. 12 is a flowchart illustrating an embodiment of operation S140 of FIG. 11, where a touch input is detected based on first and second sensing values.

FIG. 12 is a flowchart illustrating an embodiment of operation S140 of FIG. 11. Referring to FIG. 12, an operation of detecting the touch input in the touch state immediately after the touch release state of the display device 1 is released may be illustrated. FIG. 12 shows an operation when it is determined that the first sensing value includes an error, e.g., corresponds to a ghost touch.

In S141, the sensor driver 220 may generate a first correction sensing value by applying the temperature-dependent offset value to the first sensing value in the touch release state. The sensor driver 220 may multiply the first sensing value by the offset value corresponding to the temperature detected from the temperature sensor 300 to generate the first correction sensing value. In the case that the detected temperature is lower than room temperature, the offset value may be greater than 1. In the case that the detected temperature is higher than room temperature, the offset value may be less than 1. This is because the offset value is a ratio determined with reference to an assigned value of 1 corresponding to the room temperature. That is, in one embodiment, the sensor driver 220 may generate the first correction sensing value by reflecting the increase or decrease in capacitance corresponding to the detected temperature, compared to the capacitance at room temperature to the first sensing value.

In S142, the sensor driver 220 may generate the second correction sensing value by applying the temperature-dependent offset value to the second sensing value in the touch state immediately after the touch release state is released. The sensor driver 220 may generate the second correction sensing value, for example, by multiplying the second sensing value by the offset value corresponding to the temperature detected from the temperature sensor 300. In one embodiment, the offset value may be the same as the value applied to the first sensing value. The sensor driver 220 may generate the second correction sensing value by reflecting the increase or decrease in capacitance corresponding to the detected temperature, compared to the capacitance at room temperature to the second sensing value.

In S143, the sensor driver 220 may calculate a difference between the first correction sensing value and the second correction sensing value.

In S144, the sensor driver 220 may detect the touch input based on the difference between the first and second correction sensing values. The sensor driver 220 may determine that a touch input occurs if the difference between the first correction sensing value and the second correction sensing value is greater than a reference threshold. The reference threshold may be, for example, a value at which the sensor driver 220 determines the touch input at room temperature. In one embodiment, the sensor driver 220 may detect the touch input based on the first and second correction sensing values to which the offset value corresponding to detected temperature is applied. By compensating for the difference in an amount of capacitance change according to temperature using the offset value, the sensor driver 220 may determine the touch input based on the reference threshold at room temperature, even when the temperature of the sensor array 120 changes.

Figure 13:
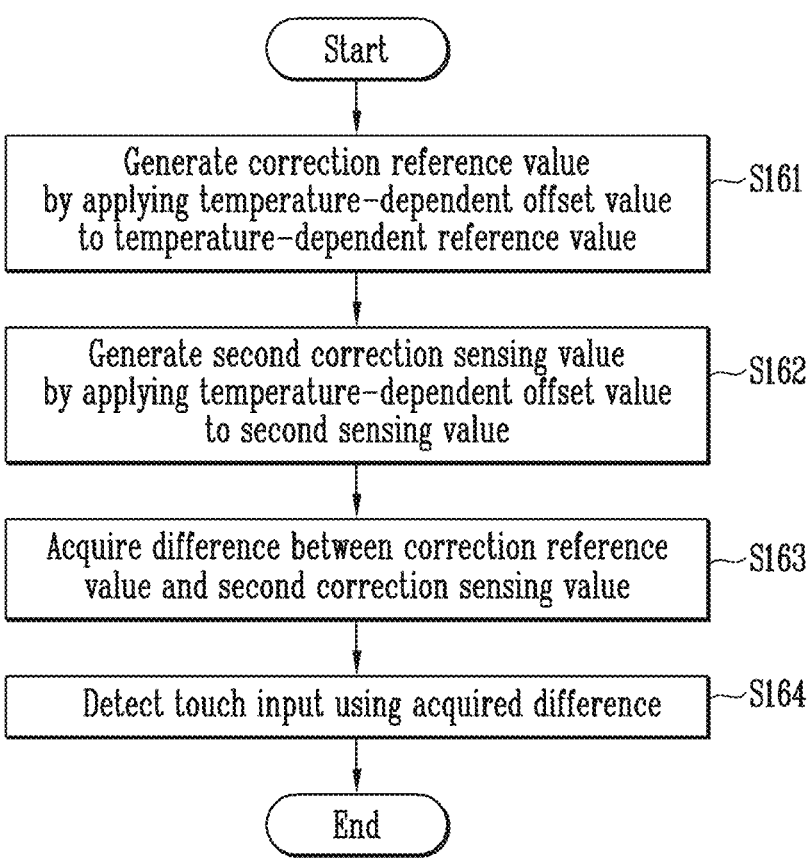
FIG. 13 is a flowchart illustrating an embodiment of operation S160 of FIG. 11, where a touch input is detected based on a reference value and a second sensing value.

FIG. 13 is a flowchart illustrating an embodiment of operation S160 of FIG. 11. Referring to FIG. 13, an operation of detecting a touch input in the touch state immediately after the touch release state of the display device 1 is released is illustrated. FIG. 13 illustrates an operation of determining that the first sensing value includes no error, e.g., no ghost touch.

In S161, the sensor driver 220 may generate a correction reference value by applying the temperature-dependent offset value to the temperature-dependent reference value, instead of the first sensing value, in the touch release state. In one embodiment, the sensor driver 220 may generate a correction reference sensing value by multiplying the reference value (corresponding to the temperature detected from the temperature sensor 300) by the offset value corresponding to the temperature. In the case that the detected temperature is lower than room temperature, the offset value may be greater than 1. In the case that the detected temperature is higher than room temperature, the offset value may be less than 1. That is because the offset value is determined by a ratio that is based on the value corresponding to room temperature. That is, the sensor driver 220 may generate the correction reference value by reflecting the increase or decrease in capacitance corresponding to the detected temperature relative to the capacitance at room temperature to the reference value.

In S162, the sensor driver 220 may generate the second correction sensing value by applying the temperature-dependent offset value to the second sensing value in the touch state immediately after the touch release state is released. The sensor driver 220 may generate the second correction sensing value by multiplying the second sensing value by the offset value corresponding to the temperature detected from the temperature sensor 300. In one embodiment, the offset value may be the same as the value applied to the reference value. The sensor driver 220 may generate the second correction sensing value by reflecting the increase or decrease in the capacitance corresponding to the detected temperature compared to the capacitance at room temperature to the second sensing value.

In S163, the sensor driver 220 may determine a difference between the correction reference value and the second correction sensing value.

In S164, the sensor driver 220 may detect the touch input based on the difference between the correction reference value and the second correction sensing value. The sensor driver 220 may determine that the touch input occurs if the difference between the correction reference value and the second correction sensing value is greater than a reference threshold. In one embodiment, the sensor driver 220 may detect the touch input based on the first and second correction sensing values, to which the offset value corresponding to the detected temperature is applied. By compensating for the difference in the amount in capacitance change according to the temperature using the offset value, the sensor driver 220 may determine the touch input based on the reference threshold at room temperature even when the temperature of the sensor array (120) changes.

Figure 14:
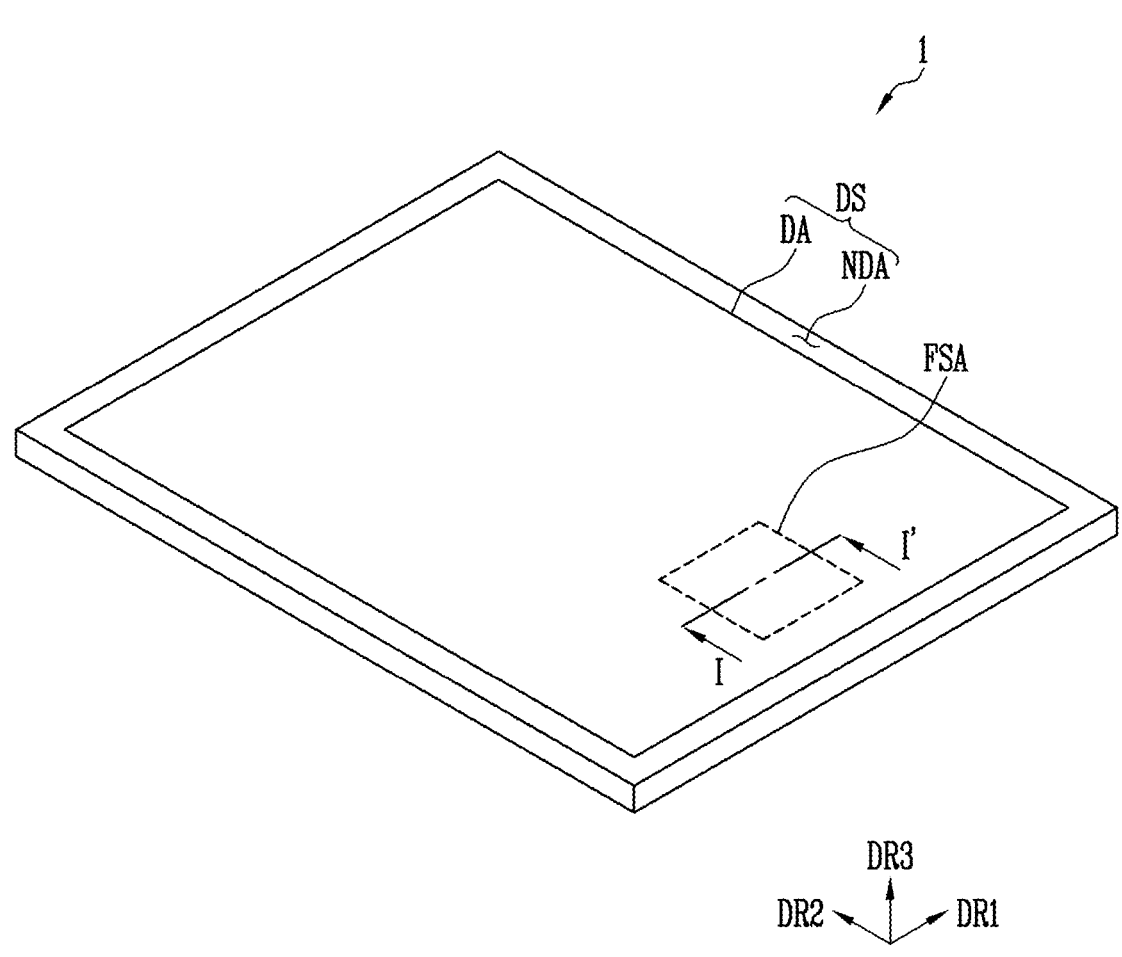
FIG. 14 is a perspective view illustrating an embodiment of the display device of FIG. 1.

FIG. 14 is a perspective view illustrating an embodiment of the display device 1 of FIG. 1. The display device 1 may be used for large electronic devices (such as televisions and monitors), as well as small and medium-sized electronic devices such as mobile phones, tablets, car navigation systems, game consoles, and smart watches.

An upper surface of the display device 1 may be a display surface (DS). The display surface (DS) may have a plane defined by the first direction (DR1) and the second direction (DR2). The display surface (DS) may include the display area (DA) and the non-display area (NDA) around the display area (DA). The display area (DA) is an area where images are displayed, and the non-display area (NDA) is an area where images are not displayed.

In embodiments, the display area (DA) may be in a rectangular shape. The display area (DA) may have the shape of a closed loop including straight and/or curved sides. The non-display area (NDA) may at least partially surround the display area (DA). However, embodiments are not limited to this, and the shapes of the display area (DA) and the non-display area (NDA) may be variously modified. For example, the display area (DA) may have shapes such as polygons, circles, semicircles, ellipses, etc.

Referring to FIG. 14, the display device 1 may include a fingerprint sensing area (FSA). The display device 100 may include the fingerprint sensor (e.g., FS, see FIG. 15) overlapping the fingerprint sensing area (FSA) at a lower part of the display surface (DS). The fingerprint sensor (FS) may be installed so that its active area faces the display area (DA) or the upper surface of the display device 1. Accordingly, the fingerprint sensor (FS) may recognize a user's fingerprint adjacent to, or in contact with, the fingerprint sensing area (FSA). In one embodiment, the fingerprint sensor (FS) may include an ultrasonic fingerprint sensor configured to generate ultrasonic signals through the active area, detect the received ultrasonic signals as the generated ultrasonic signals are reflected off the user's fingerprint, and recognize the user's fingerprint based on the detected ultrasonic signals.

Figure 15:
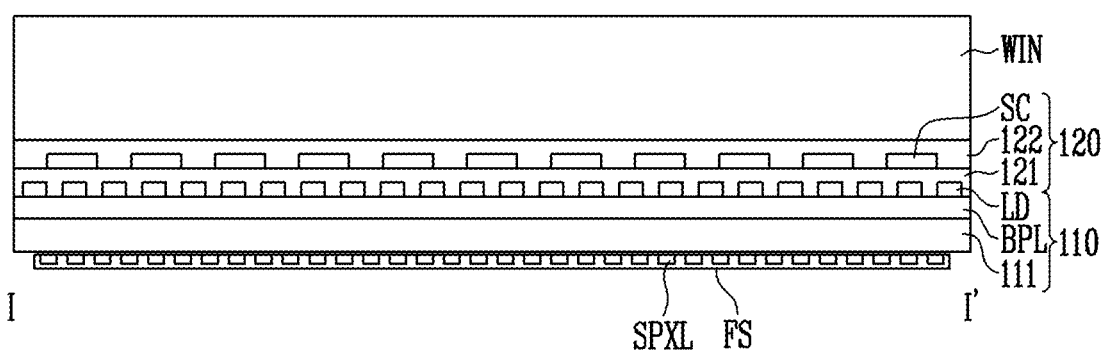
FIG. 15 is a cross-sectional diagram taken along line I-I' of FIG. 14 according to an embodiment.

FIG. 15 is a cross-sectional diagram taken along line I-I' of FIG. 14 according to one embodiment.

Referring to FIG. 15, the sensor array 120 may be stacked on the display panel 110, and a window (WIN) may be stacked on the sensor array 120.

The display panel 110 may include the display substrate 111, the circuit element layer (BPL) formed on the display substrate 111, and the light-emitting elements (LD) formed on the circuit element layer (BPL). The circuit element layer (BPL) may include pixel circuit components (e.g., transistors and capacitors) and the scan lines (SL1~SLm, see FIG. 2) for driving the light-emitting elements (LDs) of the pixels (PXLs), and the data lines (DL1~DLn, see FIG. 2). In addition, the circuit element layer (BPL) may include at least one insulation layer provided between a plurality of conductive layers.

The light-emitting elements (LDs) may be disposed on an upper surface of the circuit element layer (BPL). The light-emitting elements (LDs) may be connected to the circuit elements and/or wires of the circuit element layer (BPL), for example, through contact holes.

The sensor array 120 may include the sensor substrate 121, the sensor electrodes (SCs) formed on the sensor substrate 121, and a protective film 122 covering the sensor electrodes (SCs) for sensing a touch input. In the embodiment of FIG. 15, the sensor substrate 121 is shown to include an encapsulation film covering the pixels (PXLs), but is not limited thereto. For example, the sensor substrate 121 may exist separately from the encapsulation film covering the pixels (PXLs).

The window (WIN) is a protective member placed at the top of the module of the display device 1 and may be a substantially transparent, light-transmitting substrate. This window (WIN) may have a multi-layer structure selected from a glass substrate, a plastic film, and/or a plastic substrate. The window (WIN) may include a rigid or flexible substrate, and the composition of the window (WIN) is not limited to any particular material as long as it satisfies substantially transparent, light-transmitting properties.

In one embodiment, the display device 1 may further include a polarizing plate (or another type of anti-reflection layer) to prevent external light reflection between the window (WIN) and the sensor array 120.

Referring to FIGS. 14 and 15, the display device 1 may include the fingerprint sensor (FS) disposed on a lower surface of the display panel 110 and the display panel 110 in the fingerprint sensing area (FSA). For example, the fingerprint sensor (FS) may be disposed in the fingerprint sensing area (FSA) to overlap the display panel 110. However, the present disclosure is not limited thereto, and the fingerprint sensor (FS) may be placed on another (e.g., an upper) surface of the display panel 110. The fingerprint sensing area (FSA) may include a plurality of sensor pixels (SPXLs) distributed at a predetermined resolution and/or spacing sufficient to detect a fingerprint.

In one embodiment, the fingerprint sensor (FS) may include an ultrasonic fingerprint sensor. In this case, the sensor pixels (SPXLs) may be implemented as piezoelectric elements. For example, the thickness of a vibrating part and electrodes forming each sensor pixel (SPXL) may differ depending on the fingerprint sensing area (FSA). In this case, the amount of reflected light or the intensity of ultrasonic waves incident on the sensor pixels (SPXLs) may vary depending on the fingerprint sensing area (FSA). The fingerprint sensor (FS) shown in FIG. 14 may include the temperature sensor 300, which detects the ambient temperature or internal temperature of the display device 1.

Figure 16:
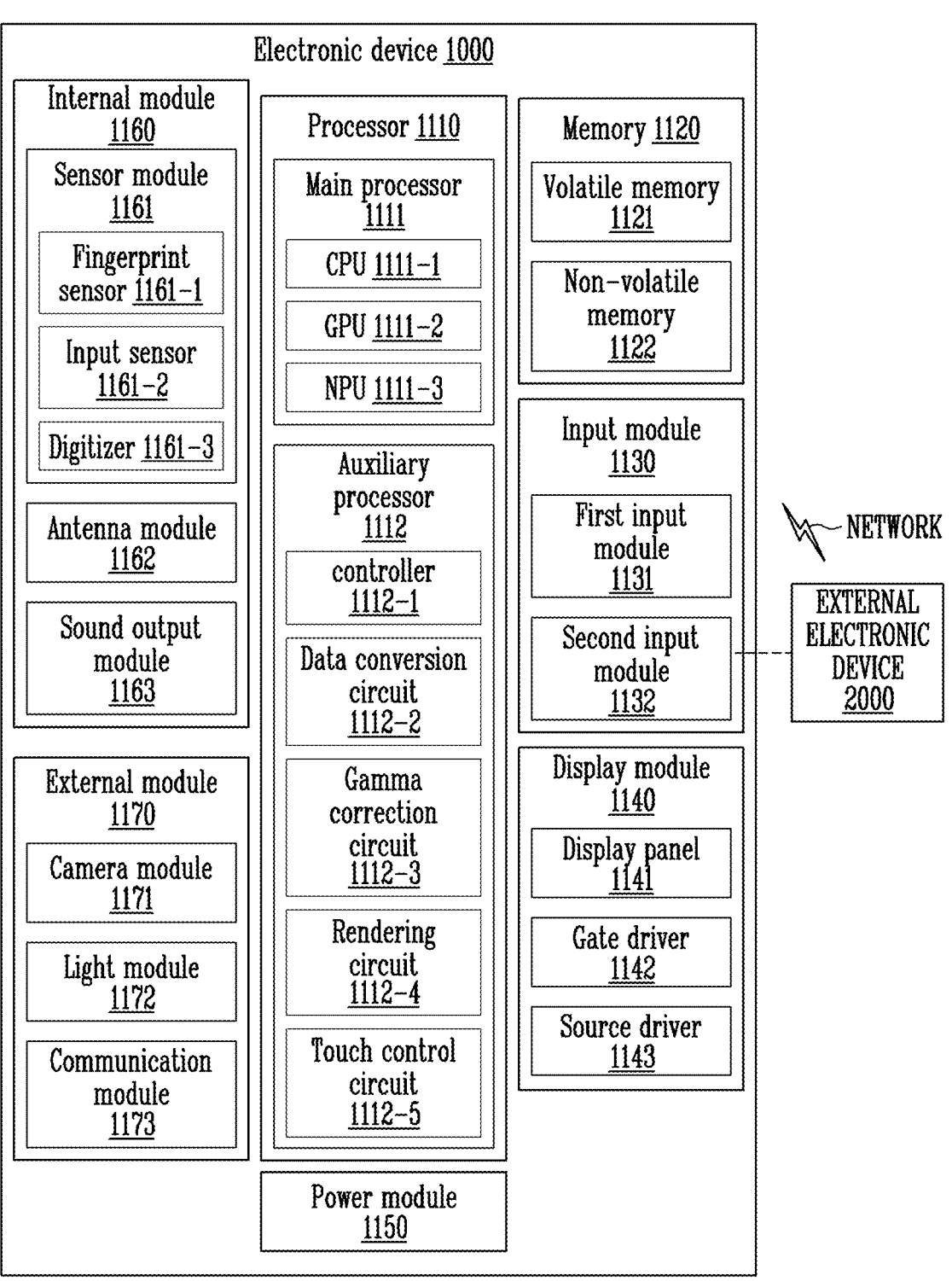
FIG. 16 is a schematic block diagram illustrating an embodiment of an electronic device including a display device according to an embodiment of the present disclosure.

FIG. 16 is a schematic block diagram illustrating an embodiment of an electronic device 1000 including a display device according to embodiments of the present disclosure. The electronic device 1000 may be a large electronic device (such as televisions and monitors), as well as small and medium-sized electronic devices such as mobile phones, tablets, car navigation systems, game consoles, and smart watches.

Referring to FIG. 16, an electronic device 1000 according to an embodiment of the present disclosure may output various types of information (e.g., image data, text data, etc.) for display through a display module 1140. When a processor 1110 executes an application stored in a memory 1120, the display module 1140 may provide application information to the user through a display panel 1141. The display panel 1141 may correspond, for example, to display panel 110 as previously discussed.

The processor 1110 may obtain an external input through an input module 1130 or a sensor module 1161 and may execute an application corresponding to the external input. For example, when the electronic device 1000 is a smart phone and a user selects a camera icon (or a camera application icon) displayed on the display panel 1141, the processor 1110 may obtain a user input through an input sensor 1161-2 and activates a camera module 1171. The processor 1110 may transmit image data corresponding to an image captured by the camera module 1171 to the display module 1140. The display module 1140 may display an image corresponding to the captured image through the display panel 1141.

As another example, when personal information authentication is performed by the display module 1140, a fingerprint sensor 1161-1 may obtain input fingerprint information as input data. The processor 1110 may compare the input data obtained through the fingerprint sensor 1161-1 with authentication data stored in the memory 1120 and execute the application according to a result of the comparison. The display module 1140 may display information executed according to logic of the application through the display panel 1141. The fingerprint sensor 1161-1 may obtain the fingerprint information over the entire area of the display module 1140 (or the display panel 1141) or a predetermined or designated area of the display module 1140.

As another example, when a music streaming icon displayed on the display module 1140 is selected, the processor 1110 may obtain the user input through an input sensor 1161-2 and activate a music streaming application stored in the memory 1120. When a music execution command is input in a music streaming application, the processor 1110 may activate a sound output module 1163 to provide the user with sound information corresponding to the music execution command.

Examples of the operation of the electronic device 1000 has been briefly described above. An example configuration of the electronic device 1000 will be described in detail below. Some of the components of the electronic device 1000 described below may be integrated and provided as one component, and alternatively a single component may be separated into two or more components in some embodiments.

The electronic device 1000 may communicate with an external electronic device 2000 through a network (e.g., a short-range wireless communication network or a long-range wireless communication network such as a mobile communications network, the internet, etc.). According to one embodiment, the electronic device 1000 may include the processor 1110, the memory 1120, the input module 1130, the display module 1140, a power module 1150, an internal module 1160, and an external module 1170. According to one embodiment, the electronic device 1000 may omit at least one of the above-described components, or one or more other components may be added. According to one embodiment, some of the components described above (e.g., the sensor module 1161, an antenna module 1162, or the sound output module 1163) may be integrated into another component (e.g., the display module (1140)).

The processor 1110 may execute software to control at least one other component (e.g., hardware or software component) of the electronic device 1000 connected to the processor 1110 and may perform various data processing or operations, for example, to support the applications of the electronic device 1000. According to one embodiment, as at least part of the data processing or operations, the processor 1110 may store commands or data received from another component (e.g., the input module 1130, the sensor module 1161, or a communication module 1173) in a volatile memory 1121, process the commands or data stored in the volatile memory 1121, and store result data in a non-volatile memory 1122.

The processor 1110 may be a single processing component or may include a main processor 1111 and at least one auxiliary processor 1112. The main processor 1111 may include a central processing unit (CPU) 1111-1 (or the application processor (AP) 30 shown in FIG. 1). The main processor 1111 may include one or more of a graphics processing unit (GPU) 1111-2, a communication processors (CP), or an image signal processor (ISP). The main processor 1111 may further include a neural processing unit (NPU) 1111-3. The neural processing unit 1111-3 may be a processor specialized in processing of an artificial intelligence model generated through machine learning. The artificial intelligence model may include a plurality of artificial neural network layers. An artificial neural network may, for example, be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-networks, or a combination of two or more thereof, but is not limited to the above examples. The artificial intelligence model may additionally, or alternatively, include a software structure in addition to a hardware structure. At least two of the above-described processing units and processors may be implemented in a single integrated configuration (e.g., a single chip), or each may be implemented in an independent configuration (e.g., multiple chips).

The auxiliary processor 1112 may have various processing architectures. For example, the auxiliary processor 112 may include a controller 1112-1. In one embodiment, the controller 1112-1 may include an interface conversion circuit and a timing control circuit. For example, the controller 1112-1 may include the controller 150 shown in FIG. 2 for controlling the display panel 110/1140. The controller 1112-1 may receive an image signal from the main processor 1111, convert the data format of the image signal to match the interface specifications with the display module 1140, and output the image data. The controller 1112-1 may output various control signals to support the operation of the display module 1140.

The auxiliary processor 1112 may further include a data conversion circuit 1112-2, a gamma correction circuit 1112-3, a rendering circuit 1112-4, and a touch control circuit 112-5 for operation in conjunction with the display module 1140. The data conversion circuit 1112-2 may receive the image data from the controller 1112-1 and, according to characteristics of the electronic device 1000 or user settings, may compensate for the image data so that the image is displayed at a desired brightness. In these or other cases, the data conversion circuit 1112-2 may convert the image data to reduce power consumption or compensate for (e.g., prevent) afterimages.

The gamma correction circuit 1112-3 may convert the image data or a gamma reference voltage, etc., so that the image displayed on the electronic device 1000 has desired gamma characteristics. The rendering circuit 1112-4 may receive the image data from the controller 1112-1 and render the image data in consideration of the pixel arrangement of the display panel 1141 applied to the electronic device 1000.

The touch control circuit 1112-5 may supply a touch signal to the input sensor 1161-2, and in response to the touch signal, be supplied with a sensing signal from the input sensor 1161-2. The touch control circuit 1112-5 may include the sensor driver 220 shown in FIG. 1.

At least one of the data conversion circuit 1112-2, the gamma correction circuit 1112-3, the rendering circuit 1112-4, or the touch control circuit 1112-5 may be integrated into another component (e.g., the main processor 1111 or the controller 1112-1). At least one of the data conversion circuit 1112-2, the gamma correction circuit 1112-3, or the rendering circuit 1112-4 may be integrated into a source driver 1143 which will be described below.

The memory 1120 may store various data used by at least one component of the electronic device 1000 (e.g., the processor 1110 or the sensor module 1161). The memory 1120 may also input data or output data for instructions associated therewith. In addition, various configuration data corresponding to a user setting may be stored in the memory 1120. The memory 1120 may include at least one or more of the volatile memory 1121 or the non-volatile memory 1122.

The input module 1130 may receive commands or data from an external source outside the electronic device 1000 (e.g., a user or external electronic device 2000) to be used in a component of the electronic device 1000 (e.g., the processor 1110, the sensor module 1161, or the sound output module 1163).

The input module 1130 may include a first input module 1131 and a second input module 1132. The first input module 1131 is one to which a command or data is input from the user. The second input module 1132 is one to which a command or data is input from the external electronic device 2000. The first input module 1131 may include one or more of a variety of input devices, including but not limited to a microphone, a mouse, a keyboard, keys (e.g., buttons), or a pen (e.g., a passive pen or an active pen). The second input module 1132 may support a specified protocol which may connect it wired or wirelessly to the external electronic device 2000. According to one embodiment, the second input module 1132 may include a high definition multimedia interface (HDMI), a universal serial bus (USB)

interface, an SD card interface, and/or an audio interface. The second input module 1132 may include a connector which may physically connect it to the external electronic device 2000, e.g., an HDMI connector, a USB connector, an SD card connector, or an audio connector (e.g., a headphone connector).

The display module 1140 provides visual information to the user. The display module 1140 may include the display driver 210 shown in FIG. 1. The display module 1140 may include the display panel 1141, a gate driver 1142, and the source driver 1143. The display module 1140 may further include a window, a chassis, and a bracket to protect the display panel 1141. Such display module 1140 may include the display device 1 shown in FIG. 1.

The display panel 1141 (or display) may, for example, include a liquid crystal display panel, an organic light emitting display panel, or an inorganic light emitting display panel, and the type of display panel 1141 is not particularly limited. The display panel 1141 may be of a rigid type, or a rollable or foldable flexible type such is found, for example, in a flip phone or other type of foldable smart phone. The display module 1140 may further include a supporter, a bracket, and/or a heat dissipation element supporting the display panel 1141. The display panel 1141 may include the panel 10 shown in FIG. 1.

The gate driver 1142 may be mounted on the display panel 1141 as a driving chip. In addition, the gate driver 1142 may be integrated into the display panel 1141. For example, the gate driver 1142 may include an amorphous silicon TFT gate driver circuit (ASG), a low temperature polycrystalline silicon (LTPS) TFT gate driver circuit, or an oxide semiconductor TFT gate driver circuit (OSG) embedded in the display panel 1141. The gate driver 1142 receives a control signal from the controller 1112-1 and, in response to the control signal, outputs scanning signals to the display panel 1141. The gate driver 1142 may include the scan driver 160 shown in FIG. 2.

The display module 1140 may further include a light-emitting driver. The light-emitting driver outputs a light-emitting control signal to the display panel 1141 in response to the control signal received from the controller 1112-1. For example, the light-emitting control signal may control transistors coupled to a driving transistor and a light-emitting device situated in each pixel of the display panel 110. The light-emitting driver may be formed separately from the gate driver 1142, or may be integrated into the gate driver 1142.

The source driver 1143 receives a control signal from the controller 1112-1, converts image data into analog voltages (e.g., data signals) in response to the control signal, and outputs the data signals to the display panel 1141 for display of an image. The source driver 1143 may include the data driver 130 shown in FIG. 2.

The source driver 1143 may be a stand-alone component or may be integrated into another component (e.g., the controller 1112-1). In one embodiment, the functions of the interface conversion circuit and the timing control circuit of the controller 1112-1 may also be integrated into the source driver 1143.

The display module 1140 may further include a voltage generation circuit 1144. The voltage generating circuit 1144 may output various voltages for operation of the display panel 1141. For example, the voltage generation circuit 1144 may include the voltage generator 140 shown in FIG. 2.

In embodiments, the display panel 1141 may include the plurality of pixels (PXLs) shown in FIG. 1. The plurality of pixels may emit different colors of light. Two or more of the plurality of pixels may form a pixel unit as previously described. In embodiments, the source driver 1143 may convert different color data (e.g., corresponding to red (R), green (G), and blue (B)) included in the image data received from the processor 1110 into red data signals (or data voltages), green data signals, and blue data signals, respectively. The red data signals, the green data signals, and the blue data signals may then be provided to pixels in a plurality of pixel columns included in the display panel 1141 for a single horizontal period.

The power module 1150 may supply power to the components of the electronic device 1000. The power module 1150 may include a battery to charge the power supply voltage. The battery may include a non-rechargeable primary battery, a rechargeable secondary battery, or a fuel cell. The power module 1150 may include a power management integrated circuit (PMIC). The PMIC supplies optimized power to each of the above-mentioned modules and modules which will be described below. The power module 1150 may include a wireless power transmitting and receiving member electrically connected to the battery. The wireless power transmitting and receiving member may include a plurality of antenna emitters in the form of coils.

The electronic device 1000 may further include an internal module 1160 and an external module 1170. The internal module 1160 may include the sensor module 1161, the antenna module 1162, and the sound output module 1163. The external module 1170 may include the camera module 1171, a light module 1172, and the communication module 1173.

The sensor module 1161 may detect a touch input by a part (e.g., finger) a user's body or an input by the pen of the first input module 1131, and generate electrical signals or data values corresponding to the detected input. The sensor module 1161 may include one or more of the fingerprint sensor 1161-1, the input sensor 1161-2, or a digitizer 1161-3.

The fingerprint sensor 1161-1 may generate a data value corresponding to the user's fingerprint. The fingerprint sensor 1116-1 may be the fingerprint sensor (FS) shown in FIG. 15.

The input sensor 1161-2 may generate a data value corresponding to coordinate information of an input by the user's body or the pen. In one embodiment, the input sensor 1161-2 may generate the amount of capacitance change that is generated by the input as the data value. The input sensor 1161-2 may detect an input by a passive pen or may send and receive data with the active pen. The input sensor 1161-2 may be the sensor electrodes (SCs) shown in FIG. 1.

The input sensor 1161-2 may also measure biological signals such as blood pressure, moisture, or body fat. For example, when the user touches a part of his or her body to a sensor layer or sensing panel and does not move for a predetermined period of time, the input sensor 1161-2 may detect the biological signal based on a change in electric field caused by the body part. The input sensor 1161-2 may then output information desired by the user to the display module 1140.

The digitizer 1161-3 may generate a data value corresponding to the coordinate information of the input by the pen. The digitizer 1161-3 generates the amount of electromagnetic change by the input as the data value. The digitizer 1161-3 may detect the input by the passive pen or transmit and receive data with the active pen.

At least one of the fingerprint sensor 1161-1, the input sensor 1161-2, or the digitizer 1161-3 may be implemented as the sensor layer or sensing panel formed on the display panel 1141 through a continuous process. At least one of the fingerprint sensor 1161-1, the input sensor 1161-2, or the digitizer 1161-3 may be disposed on one side (e.g., the upper side) of the display panel 1141, and any one of the fingerprint sensor 1161-1, the input sensor 1161-2, or the digitizer 1161-3 may be disposed on the lower side of the display panel 1141.

At least two of the fingerprint sensor 1161-1, the input sensor 1161-2, or the digitizer 1161-3 may be configured to be integrated into a single sensing panel through the same process. When integrated into the single sensing panel, the sensing panel may be placed between the display panel 1141 and a window placed on the upper side of the display panel 1141. According to one embodiment, the sensing panel may be disposed on the window. The position of the sensing panel may vary among embodiments.

At least one of the fingerprint sensor 1161-1, the input sensor 1161-2, or the digitizer 1161-3 may be embedded in the display panel 1141. For example, at least one of the fingerprint sensor 1161-1, the input sensor 1161-2, or the digitizer 1161-3 may be formed simultaneously through a process used to form the elements (e.g., the light-emitting element, the transistors, etc.) included in the display panel 1141.

In addition, the sensor module 1161 may generate electrical signals or data values corresponding to an internal or external state of the electronic device 1000. The sensor module 1161 may include, for example, one or more haptic or environmental sensors. Examples of the haptic and environmental sensors include, but are not limited to, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an ambient light sensor.

The antenna module 1162 may include one or more antennas for transmitting or receiving signals and/or power to or from external devices or systems. In one embodiment, the communication module 1173 may transmit a signal to an external electronic device through an antenna appropriate to the communication method, or receive a signal from an external electronic device. An antenna pattern of the antenna module 1162 may be integrated into one configuration of the display module 1140 (e.g., the display panel 1141) or the input sensor 1161-2.

The sound output module 1163 is a device for outputting an audio signal from the electronic device 1000. Examples of the sound output module 1163 includes a speaker used for general purposes such as multimedia playback or recording playback and a receiver used exclusively for telephone reception. According to one embodiment, the receiver may be formed integrally with or provided separately from the speaker. A sound output pattern of the sound output module 1163 may also be integrated into the display module 1140.

The camera module 1171 may capture still images and moving pictures. According to one embodiment, the camera module 1171 may include one or more lenses, an image sensor, or an image signal processor. The camera module 1171 may further include an infrared camera which may measure the presence of a user, the user's position, the user's line of sight, etc.

The light module 1172 may provide light. The light module 1172 may include a light-emitting diode or xenon lamp. The light module 1172 may operate in conjunction with the camera module 1171 or independently.

The communication module 1173 may support establishment of a wired or wireless communication channel between the electronic device 1000 and the external electronic device 2000 and performance of communication over the established communication channel. The communication module 1173 may include one or both of a wireless communication module (such as a cellular communication module, a short-range wireless communication module, or a global navigation satellite system (GNSS) communication module) and a wired communication module, such as a local area network (LAN) communication module, or a power line communication module. The communication module 1173 may communicate with the external electronic device 2000 via a short-range communication network (such as Bluetooth, WiFi direct or infrared data association (IrDA)) or a long-range communication network such as a cellular network, the Internet, or a computer network (e.g., LAN or WAN). The various types of communication modules 1173 described above may be implemented as a single chip or each may be implemented as a separate chip.

The input module 1130, the sensor module 1161, the camera module 1171, and the like may be used to control operation of the display module 1140 in conjunction with the processor 1110.

The processor 1110 outputs commands or data to the display module 1140, the sound output module 1163, the camera module 1171, or the light module 1172 based on the input data received from the input module 1130. For example, the processor 1110 may generate image data in response to input data applied through an input device (such as a mouse or active pen) and output it to the display module 1140. In one embodiment, the processor 1110 may generate command data in response to the input data and output the command data to the camera module 1171 or light module 1172. When no input data is received from the input module 1130, for example, over a predetermined period of time, the processor 1110 may reduce power consumption of the electronic device 1000 by switching the operation mode of the electronic device 1000 to a low power mode or sleep mode.

The processor 1110 may output commands or data to the display module 1140, the sound output module 1163, the camera module 1171, and/or the light module 1172 based on the sensing data received from the sensor module 1161. For example, the processor 1110 may compare authentication data authorized by the fingerprint sensor 1161-1 with authentication data stored in the memory 1120 and then execute an application based on the comparison result. The processor 1110 may execute a command based on the sensing data detected by the input sensor 1161-2 or digitizer 1161-3 or output corresponding image data to the display module 1140. If the sensor module 1161 includes the temperature sensor (e.g., temperature sensor 300 shown in FIG. 2), the processor 1110 may receive temperature data for the detected temperature (e.g., ambient temperature) from the sensor module 1161 and, based on the temperature data, perform brightness correction for the image data.

The processor 1110 may receive measurement data regarding the presence of the user, the user's position, the user's line of sight, etc., from the camera module 1171. The processor 1110 may further perform brightness correction on the image data based on the measurement data. For example, the processor 1110, which determines the presence of the user through input from the camera module 1171, may output image data whose brightness has been corrected to the display module 1140 through the data conversion circuit 1112-2 or the gamma correction circuit 1112-3.

Some of the components may be connected to each other via a communication method between peripherals, e.g., a bus, a general purpose input/output (GPIO), a serial peripheral interface (SPI), a mobile industry processor interface (MIPI), or an ultra path interconnect (UPI) link, so that signals (e.g., commands or data) may be exchanged with each other. The processor 1110 may communicate with the display module 1140 using a mutually agreed interface, and, for example, may use any of the above-described communication methods, including but not limited to the above-described communication methods.

In accordance with the aforementioned embodiments of the display device, electronic device, and method of operating the display device of the present disclosure, the display device may determine whether a sensing value is an actual touch input by using a reference value corresponding to the temperature in the touch release state. If it is determined that the sensing value is not an actual touch input (e.g., is a ghost touch), the touch input may be detected using the reference value corresponding to the temperature instead of the sensing value. As a result, the display is not affected by the existence of a ghost touch due to temperature changes during the touch release state, and may reliably detect the touch input. According to embodiments of the present disclosure, there are provided a display device with improved reliability, an electronic device, and a method of operating the same.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, units, generators, logic, interfaces, drivers, blocks, and other signal generating and signal processing features of the embodiments disclosed herein may be implemented, for example, in non-transitory logic that may include hardware, software, or both. When implemented at least partially in hardware, the controllers, processors, devices, modules, units, generators, logic, interfaces, drivers, blocks, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit. In some embodiments, these features may be implemented by a neural network, machine-learning logic, or other form of artificial intelligence.

When implemented in at least partially in software, the controllers, processors, devices, modules, units, generators, logic, interfaces, drivers, blocks, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Effects according to embodiments are not limited to those exemplified above, and more diverse effects are included in the present specification.

Although specific embodiments and applications have been described herein, other embodiments and variations may be derived from the above description. Therefore, the idea of the present disclosure is not limited to these embodiments, but extends to the appended claims, various obvious modifications, and equivalents. The embodiments of the present disclosure may be combined to form additional embodiments.

What is claimed is:

1. A display device comprising:
a display panel comprising pixels;
a memory configured to store a plurality of lookup tables;
a sensor array disposed on the display panel and comprising sensor electrodes;
a sensor driver configured to detect a touch input using the sensor electrodes; and
a temperature sensor configured to detect a temperature of the sensor array, wherein the sensor driver is configured to:
obtain a first sensing value from the sensor electrodes in a touch release state, and compare the first sensing value with a reference value stored in a first look-up table of the plurality of the look-up tables corresponding to the temperature to determine whether the first sensing value corresponds to a touch input error, and
obtain a second sensing value from the sensor electrodes in a touch state occurring after the touch release state, wherein, when the first sensing value is determined to include the touch input error, the sensor driver is configured to detect the touch input based on the reference value and the second sensing value.

2. The display device according to claim 1, wherein the sensor driver is configured to:
determine that the first sensing value includes the error when a difference between the first sensing value and the reference value exceeds a reference range, and
determine that the first sensing value does not include the error when the difference between the first sensing value and the reference value is within the reference range.

3. The display device according to claim 1, wherein the sensor driver is configured to:
receive a first sensing signal from the sensor electrodes in the touch release state, and acquire the first sensing value from the first sensing signal,
receive a second sensing signal from the sensor electrodes in the touch state after the touch release state is released, and acquire the second sensing value from the second sensing signal, and detect the touch input based on a difference between the reference value and the second sensing value when the first sensing value is determined to include the error.

4. The display device according to claim 3, wherein the sensor driver is configured to:
generate a correction reference value by applying an offset value corresponding to the temperature to the reference value, and
generate a second correction sensing value by applying the offset value to the second sensing value.

5. The display device according to claim 4, wherein the sensor driver is configured to:
generate the correction reference value by multiplying the reference value and the offset value,
generate the second correction sensing value by multiplying the second sensing value and the offset value, and
detect the touch input based on a difference between the correction reference value and the second correction sensing value.

6. The display device according to claim 4, wherein the offset value increases as the temperature decreases.

7. The display device according to claim 4, wherein the offset value is set as a ratio of a second reference value at room temperature to a first reference value at a particular temperature.

8. The display device according to claim 3, wherein the sensor driver is configured to detect the touch input based on a difference between the first sensing value and the second sensing value when the first sensing value is determined to not include the error.

9. The display device according to claim 8, wherein the sensor driver is configured to:
apply an offset value corresponding to the temperature to the first sensing value to generate a first correction sensing value, and
apply the offset value to the second sensing value to generate a second correction sensing value.

10. The display device according to claim 9, wherein the sensor driver is configured to:
generate the first correction sensing value by multiplying the first sensing value by the offset value,
generate the second correction sensing value by multiplying the second sensing value by the offset value, and
detect the touch input based on a difference between the first correction sensing value and the second correction sensing value.

11. The display device according to claim 1, wherein the memory is configured to store a plurality of reference values in association with a plurality of temperatures, including the reference value corresponding to the temperature of the sensor array detected by the temperature sensor.

12. The display device according to claim 11, wherein the memory is configured to store a second look-up table containing an offset value corresponding to the temperature.

13. The display device according to claim 1, wherein:
an ultrasonic fingerprint sensor configured to generate ultrasonic signals to perform fingerprint recognition is connected to the sensor driver, and
the temperature sensor is included in the ultrasonic fingerprint sensor.

14. A method of operating a display device comprising a sensor array having sensor electrodes, the method comprising:
detecting a temperature of the sensor array;
obtaining a first sensing value from the sensor electrodes in a touch release state;

comparing the first sensing value with a reference value corresponding to the temperature to determine whether the first sensing value includes an error;

obtaining a second sensing value from the sensor electrodes in a touch state; and detecting a touch input based on the reference value and the second sensing value when the first sensing value is determined to include the error.

15. The method according to claim 14, wherein detecting the touch input comprises:

applying an offset value corresponding to the temperature to the reference value to generate a correction reference value;

applying the offset value to the second sensing value to generate a second correction sensing value; and detecting the touch input based on the correction reference value and the second correction sensing value.

16. The method according to claim 15, wherein detecting the touch input comprises detecting the touch input based on a difference between the correction reference value and the second correction sensing value.

17. The method according to claim 14, wherein detecting the touch input comprises detecting the touch input based on the first sensing value and the second sensing value when the first sensing value is determined to not include the error.

18. The method according to claim 17, wherein detecting the touch input comprises:

applying an offset value corresponding to the temperature to the first sensing value to generate a first correction sensing value;

applying the offset value to the second sensing value to generate a second correction sensing value; and detecting the touch input based on the first correction sensing value and the second correction sensing value.

19. The method according to claim 18, wherein detecting the touch input further comprises detecting the touch input based on a difference between the first correction sensing value and the second correction sensing value.

20. An electronic device, comprising:

a display device; and a power source to provide power to the display device, wherein the display device comprises:

a display panel comprising pixels;

a sensor array disposed on the display panel and comprising sensor electrodes;

a sensor driver configured to detect a touch input using the sensor electrodes; and a temperature sensor configured to detect a temperature of the sensor array, wherein the sensor driver is configured to:

obtain a first sensing value from the sensor electrodes in a touch release state, and compare the first sensing value with a reference value corresponding to the temperature to determine whether the first sensing value includes an error, and obtain a second sensing value from the sensor electrodes in a touch state, wherein, when the first sensing value is determined to include the error, the sensor driver is configured to detect the touch input based on the reference value and the second sensing value.

* * * * *